US010909392B1

(12) United States Patent
Chaudhuri et al.

(10) Patent No.: US 10,909,392 B1
(45) Date of Patent: Feb. 2, 2021

(54) SYSTEMS AND METHODS FOR COMPUTER-BASED LABELING OF SENSOR DATA CAPTURED BY A VEHICLE

(71) Applicant: Lyft, Inc., San Francisco, CA (US)

(72) Inventors: Rupsha Chaudhuri, Campbell, CA (US); Kumar Hemachandra Chellapilla, Mountain View, CA (US); Tanner Cotant Christensen, Redwood City, CA (US); Newton Ko Yue Der, San Mateo, CA (US); Joan Devassy, San Mateo, CA (US); Suneet Rajendra Shah, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 16/729,264

(22) Filed: Dec. 27, 2019

(51) Int. Cl.
*G06K 9/00* (2006.01)
*G05D 1/02* (2020.01)

(52) U.S. Cl.
CPC ....... *G06K 9/00805* (2013.01); *G05D 1/0214* (2013.01); *G06K 9/00208* (2013.01); *G05D 2201/0213* (2013.01); *G06K 2209/40* (2013.01)

(58) Field of Classification Search
CPC .......... G06K 9/00791; G06K 9/00832; G06K 2209/23; G06K 2209/21; G06T 2207/30236; G06T 2207/30248; G06T 2207/30252; G06T 2207/30261; G06T 2207/30241; G06T 7/292; G06T 7/285; G06T 7/215; G06T 7/223; G06T 7/231; G06T 7/248; G06T 7/246; G06T 7/251; G06T 7/269; G06T 7/262; G01C 21/3602; G08B 13/19608; G08B 13/1961; A61B 2034/2065; A61B 2034/2057
See application file for complete search history.

(56) References Cited

U.S. PATENT DOCUMENTS

| | | | | |
|---|---|---|---|---|
| 4,893,182 A * | 1/1990 | Gautraud | ............. | G01S 3/7865 348/579 |
| 4,980,762 A * | 12/1990 | Heeger | .................. | G06T 7/246 348/700 |
| 5,294,978 A * | 3/1994 | Katayama | ............... | G06T 7/246 375/240.12 |
| 7,143,083 B2 * | 11/2006 | Carlbom | ............. | G06F 16/7837 |
| 7,428,345 B2 * | 9/2008 | Caspi | ........................ | G06T 7/20 348/36 |

(Continued)

*Primary Examiner* — Avinash Tentrapati
(74) *Attorney, Agent, or Firm* — Lee Sullivan Shea & Smith LLP

(57) ABSTRACT

Examples disclosed herein may involve (i) based on an analysis of 2D data captured by a vehicle while operating in a real-world environment during a window of time, generating a 2D track for at least one object detected in the environment comprising one or more 2D labels representative of the object, (ii) for the object detected in the environment: (a) using the 2D track to identify, within a 3D point cloud representative of the environment, 3D data points associated with the object, and (b) based on the 3D data points, generating a 3D track for the object that comprises one or more 3D labels representative of the object, and (iii) based on the 3D point cloud and the 3D track, generating a time-aggregated, 3D visualization of the environment in which the vehicle was operating during the window of time that includes at least one 3D label for the object.

22 Claims, 19 Drawing Sheets

(56) References Cited

U.S. PATENT DOCUMENTS

| | | | | |
|---|---|---|---|---|
| 8,009,863 | B1* | 8/2011 | Sharma | G06K 9/00335 |
| | | | | 382/100 |
| 8,254,626 | B2* | 8/2012 | Takamori | G08B 13/19691 |
| | | | | 382/103 |
| 2003/0023595 | A1* | 1/2003 | Carlbom | G06F 16/738 |
| 2006/0284976 | A1* | 12/2006 | Girgensohn | G06F 16/786 |
| | | | | 348/135 |
| 2008/0130951 | A1* | 6/2008 | Wren | H04N 7/18 |
| | | | | 382/103 |
| 2008/0152193 | A1* | 6/2008 | Takamori | G08B 13/19691 |
| | | | | 382/103 |
| 2015/0334371 | A1* | 11/2015 | Galera | G06K 9/00201 |
| | | | | 348/46 |
| 2017/0186177 | A1* | 6/2017 | Nagori | G06T 7/579 |
| 2017/0193311 | A1* | 7/2017 | Poddar | G06F 9/30007 |
| 2017/0278402 | A1* | 9/2017 | Yalla | G01C 21/3602 |
| 2019/0026948 | A1* | 1/2019 | Kellogg | G06T 7/246 |
| 2019/0197778 | A1* | 6/2019 | Sachdeva | G06T 17/05 |

* cited by examiner

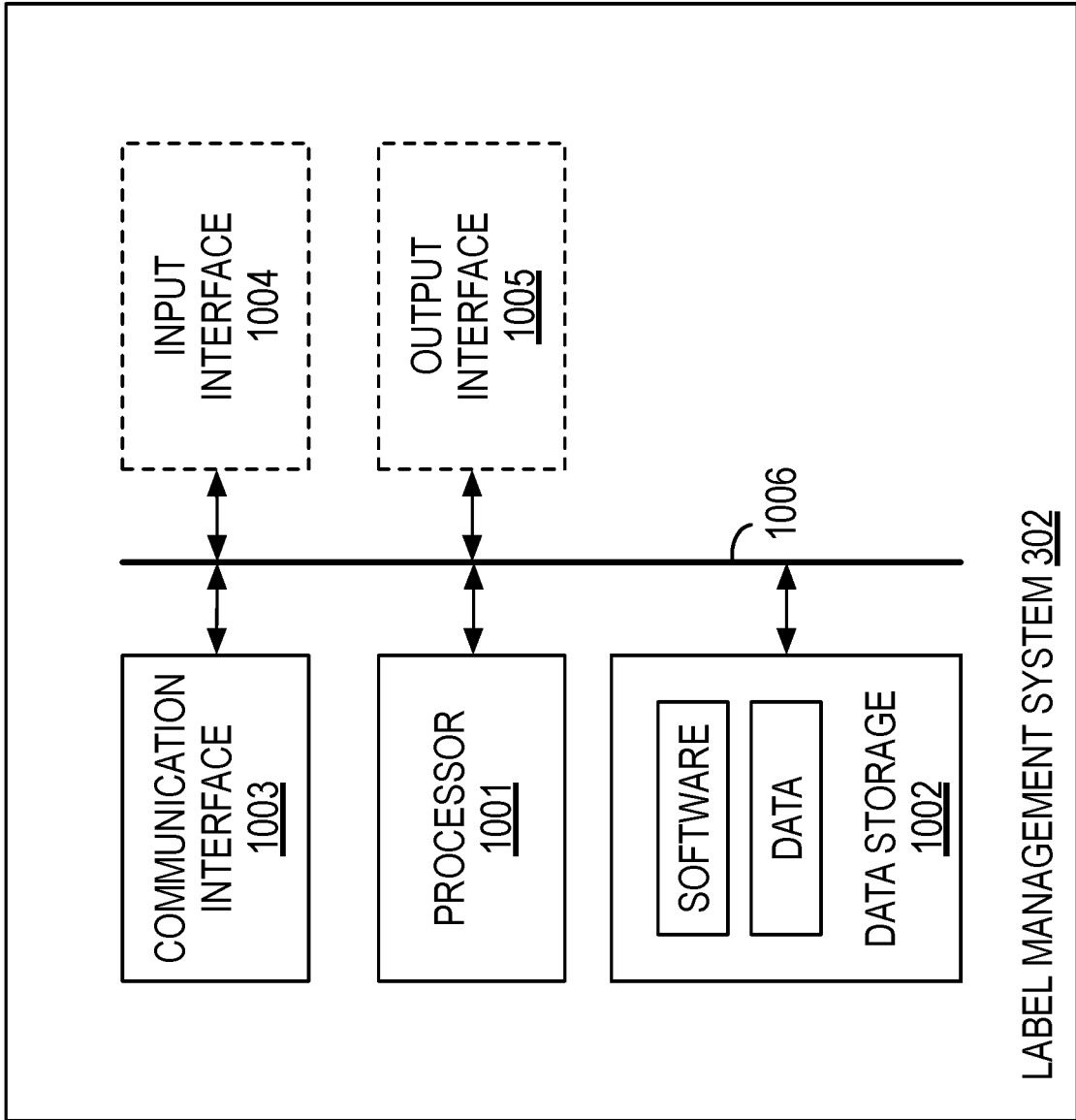

SYSTEMS AND METHODS FOR COMPUTER-BASED LABELING OF SENSOR DATA CAPTURED BY A VEHICLE

BACKGROUND

Vehicles (as well as robotics platforms or the like) are increasingly being equipped with technology that enables them to monitor their surrounding environment and perform certain tasks with little or no human input, as appropriate. For instance, a vehicle may be equipped with sensors that are configured to capture various types of sensor data that is representative of the vehicle's surrounding environment, an on-board computing system that is configured to perform functions such as localization, object detection, and behavior planning, and perhaps also actuators that are configured to control the physical behavior of the vehicle, among other possibilities.

SUMMARY

Various embodiments of the present technology involve a method for processing, labeling, and presenting sensor data that comprises: (i) based on an analysis of two-dimensional (2D) image data captured by a vehicle while operating in a real-world environment during a window of time, generating a respective 2D track for each of one or more objects detected in the real-world environment, wherein each respective 2D track comprises a set of one or more 2D labels that are representative of a respective object across the window of time, (ii) for each of the one or more objects detected in the real-world environment: (a) using the respective 2D track for an object to identify, within a three-dimensional (3D) point cloud that is representative of the real-world environment in which the vehicle was operating during the window of time, a respective set of 3D data points associated with the object across the window of time, and (b) based on the respective set of 3D data points associated with the object across the window of time, generating a respective 3D track for the object, wherein the respective 3D track comprises a set of one or more 3D labels that are representative of the object across the window of time, and (iii) based on the 3D point cloud and the respective 3D track for each of the one or more objects, generating a time-aggregated, 3D visualization of the real-world environment in which the vehicle was operating during the window of time that includes at least one respective 3D label for each of the one or more objects.

In example embodiments, each 2D label included in the respective 2D track for each of the one or more objects may comprise one or both of a 2D bounding box or a 2D object mask.

In example embodiments, each 3D label included in the respective 3D track for each of the one or more objects may comprise one or both of a 3D bounding box or a 3D convex hull.

In example embodiments, the aforementioned method may further involve (i) receiving, from a client station, a request to change the at least one respective 3D label for a given object of the one or more objects and (ii) updating the respective 3D track for the given object in accordance with the requested change to the least one respective 3D label for the given object. Further, in such example embodiments, the function of updating the respective 3D track for the given object in accordance with the requested change to the least one respective 3D label for the given object may involve propagating the requested change to each of one or more other 3D labels included in the respective 3D track for the given object using a motion model.

In example embodiments, the aforementioned method may further involve generating the 3D point cloud based at least on (i) sensor data captured by the vehicle while operating in the real-world environment during the window of time and (ii) localization data associated with the vehicle. In this respect, in some example embodiments, a preliminary 3D point cloud may first be generated based at least on (i) the sensor data and (ii) the localization data, and one or more filters may then be applied to the preliminary 3D point cloud in order to generate the 3D point cloud.

For example, applying the one or more filters to the preliminary 3D point cloud may involve (i) identifying a semantic map associated with the real-world environment in which the vehicle was operating during the window of time, (ii) identifying data indicating a trajectory of the vehicle, (iii) creating a cropped version of the semantic map that excludes map features outside of a predetermined distance from the trajectory of the vehicle, (iv) based on the cropped version of the semantic map, identifying one or more irrelevant objects within the real-world environment, and (v) applying a filter to the preliminary 3D point cloud to remove 3D data points from the preliminary 3D point cloud that are associated with the one or more irrelevant objects.

As another example, applying the one or more filters to the preliminary 3D point cloud may involve applying a filter to the preliminary 3D point cloud to remove 3D data points from the preliminary 3D point cloud that are identified as being associated with a ground feature within the real-world environment.

As yet another example, applying the one or more filters to the preliminary 3D point cloud may involve applying a filter to the preliminary 3D point cloud to remove 3D data points from the preliminary 3D point cloud that are identified as outliers relative to other 3D data points in the preliminary 3D point cloud.

In example embodiments, the aforementioned method may further involve, for each of the one or more objects detected in the real-world environment, based on the respective 3D track for an object, determining whether the object was moving at any point during the window of time, and the time-aggregated, 3D visualization may further include a respective indication of whether each of the one or more objects was moving at any point during the window of time.

In example embodiments, the aforementioned method may further involve, for each of the one or more objects detected in the real-world environment, generating a respective data structure for an object that comprises one or more of (i) an identifier of the object, (ii) a classification assigned to the object, (iii) the 3D track for the object, (iv) an indication of whether the object was in motion at any point during the window of time, (v) an indication of which capture of 3D sensor data provides a best view of the object, or (vi) a convex hull that demarcates the respective set of 3D data points associated with the object.

Moreover, various embodiments of the present technology involve a computing system comprising at least one processor, a non-transitory computer-readable medium, and program instructions stored on the non-transitory computer-readable medium that are executable by the at least one processor such that the computing system is configured to carry out the aforementioned method functions.

Additionally, various embodiments of the present technology involve a non-transitory computer-readable medium comprising program instructions stored thereon that are executable to cause a computing system to carry out the aforementioned method functions.

One of ordinary skill in the art will appreciate these as well as numerous other embodiments in reading the following disclosure.

BRIEF DESCRIPTION OF THE DRAWINGS

FIG. 10 depicts a simplified block diagram of an example auto-labeling system.

DETAILED DESCRIPTION

Figure 1A:
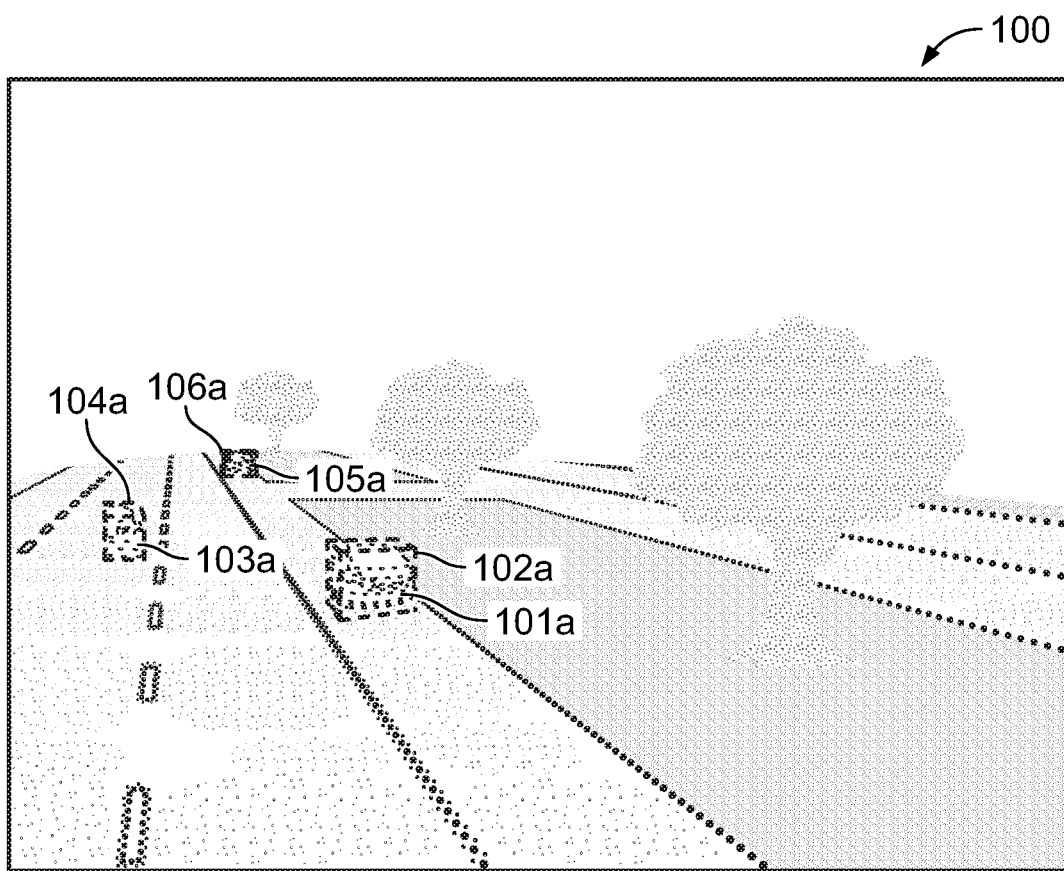
FIG. 1A depicts an example visualization of 3D sensor data from a first LIDAR sweep that may be presented to a curator for labeling.

As discussed above, vehicles are increasingly being equipped with technology that enables them to monitor their surrounding environment and perform certain tasks with little or no human input, as appropriate. For example, a vehicle may be equipped with sensors that are configured to capture various types of sensor data that is representative of the vehicle's surrounding environment, an on-board computing system that is configured to perform functions such as localization, object detection, and behavior planning, and perhaps also actuators that are configured to control the physical behavior of the vehicle, among other possibilities. This technology is critical for vehicles that are designed to operate autonomously, such as semi- (or "conditionally-") and fully-autonomous vehicles, and aspects of this technology can be used to assist human drivers of manually-driven vehicles as well.

One core aspect of the aforementioned technology is object detection. In general, object detection typically involves training a computer to detect objects of interest using previously-captured sensor data that is labeled to identify one or more object classes of interest within the sensor data (which may be referred to as the "training dataset"), embodying the computer's training into one or more object-detection models, and then applying the one or more object-detection models to unlabeled sensor data in order to detect instances of the one or more object classes of interest within that unlabeled sensor data. When training a computer to detect objects of interest, the size of the training dataset is typically proportional to the level of accuracy that the resulting object detection models can achieve, and as such, a large training dataset is often required to develop object-detection models that can detect objects of interest within unlabeled sensor data with acceptable accuracy. This is particularly the case when developing object-detection models used in vehicles designed to operate autonomously, which typically require highly-accurate object detection while perceiving their surrounding environments in order to ensure safe and efficient navigation and driving.

Another core aspect of the aforementioned technology is high-definition (HD) maps. Indeed, in order to perform tasks such as localization and navigation, a vehicle designed to operate autonomously typically needs to be provisioned with an HD map (e.g., a map having a centimeter-level resolution) that includes a great amount of detail regarding the real-world environment in which the vehicle is operating. In this respect, the process for creating such an HD map typically involves capturing high-resolution sensor data that is representative of a real-world environment and then labeling that sensor data to identify various objects in the real-world environment (e.g., roads, lane markings, traffic lights, stop signs, buildings, etc.).

In practice, the sensor data that is used to perform object detection and/or create HD maps may be of various types, examples of which may include (i) sensor data captured in a two-dimensional (2D) space, such as 2D image data, and (ii) sensor data captured in a three-dimensional (3D) space, such as Light Detection and Ranging (LIDAR) data, Radio Detection and Ranging (RADAR) data, and/or Sound Navigation and Ranging (SONAR) data. Notably, these different sensor data types may have their own respective advantages and weaknesses when used for purposes of performing object detection and/or creating HD maps. For instance, 2D sensor data may be well suited for tasks such as detecting and classifying objects in a vehicle's surrounding environment, but it is typically difficult to determine where objects are positioned within the real-world environment surrounding a vehicle based on 2D sensor data alone. On the other hand, 3D sensor data such as LIDAR data, RADAR data, or SONAR data may be well suited for tasks such as determining the position of objects in the real-world environment surrounding a vehicle, but it is typically difficult to detect and classify objects based on 3D sensor data alone, which is due in part to the fact that each individual capture of 3D sensor data provides a relatively sparse representation of a vehicle's surrounding environment that typically includes only partial views of objects in that surrounding environment. Thus, in order to leverage the relative strengths of these different types of sensor data, it is generally desirable to make use of multiple different types of sensor data when performing object detection and/or creating HD maps, such as 2D image data together with at least one type of 3D sensor data.

In view of the foregoing, it is apparent that accurate labeling of data representative of real-world environments in which vehicles may operate is an important task that needs to be performed in order to enable vehicles to perform operations such as autonomous navigation and driving. In this respect, humans (sometimes referred to as "curators") are typically tasked with reviewing data that is representative of real-world environments in which vehicles may operate (e.g., 2D image data and/or 3D sensor data captured by collection vehicles while out on missions in real-world environments) and then manually labeling certain objects (and other features) of interest within such data. However, this task of manually labeling data that is representative of real-world environments is human-labor intensive, time consuming, and prone to human error, among other deficiencies.

As one example to demonstrate the deficiencies of this manual labeling approach, consider a collection vehicle capturing both 2D and 3D sensor data while out on a mission in a real-world environment. With respect to the 2D sensor data, the collection vehicle typically uses an array of cameras (e.g., 6-7 cameras), each of which captures images of a portion of the collection vehicle's surrounding environment at a rate of 60 images per second. Each image from each camera includes 2D sensor data for objects that the collection vehicle encounters during its missions, such as buildings, other vehicles, pedestrians, trees and other plants, etc. A curator is tasked with identifying and labeling objects that were in the collection vehicle's surrounding environment on an image-by-image basis by (i) reviewing a visualization of the 2D sensor data captured by the vehicle in a given image, (ii) identifying within the given image any objects that were in the vehicle's surrounding environment, (iii) discerning between objects that are of interest and those that are not, and then (iv) applying a respective 2D label to a respective portion of the given image that is associated with each object of interest. In practice, a given 2D label applied by a curator may include an indication of a classification of a given object of interest and a 2D bounding box that circumscribes a respective portion of a given image that is associated with the given object of interest. A 2D bounding box may be defined in a variety of manners. For example, a 2D bounding box may be defined in terms of a set of x- and y-coordinates that indicate the four vertices of the 2D bounding box. As another example, a 2D bounding box may be defined in terms of an x- and y-coordinate that indicates a centerpoint of the 2D bounding box, a set of width and length values for the 2D bounding box, and an orientation value for the 2D bounding box. Other examples are possible as well.

With respect to the 3D sensor data, in one implementation, the collection vehicle may use a LIDAR device that captures 360° views of the collection vehicle's surrounding environment at a rate of 10 sweeps per second. Each sweep includes captured 3D sensor data for objects that the collection vehicle encounters during its mission. However, for any given sweep, the captured 3D sensor data is often sparse for any given object, which can make identifying and labeling a given object within that data difficult. Nevertheless, a curator is typically tasked with identifying and labeling objects that were in the collection vehicle's surrounding environment on a sweep-by-sweep basis by (i) reviewing a visualization of the 3D sensor data captured by the vehicle during a given sweep, (ii) identifying any objects that were in the vehicle's surrounding environment based on the sparse 3D sensor data captured during the given sweep, (iii) discerning between objects that are of interest and those that are not, and then (iv) applying a respective 3D label to 3D sensor data within the given sweep that is associated with each object of interest. In practice, a given 3D label applied by a curator may include an indication of a classification of a given object of interest and a 3D bounding box that circumscribes a respective portion of a given sweep that is associated with the given object of interest. A 3D bounding box may be defined in a variety of manners. For example, a 3D bounding box may be defined in terms of an x-, y-, and z-coordinate that indicates a centerpoint of the 3D bounding box, a set of width, length, and depth values for the 3D bounding box, and a set of yaw, pitch, and roll values for the 3D bounding box. As another example, a 3D bounding box may be defined in terms of a set of x-, y-, and z-coordinates that indicate the eight vertices of the 3D bounding box. Other examples are possible as well.

The difficulties of this task with 3D sensor data are illustrated by FIG. 1A, which depicts an example visualization 100 of 3D sensor data captured during a first LIDAR sweep of a collection vehicle (not shown) that is driving in a right lane of a road. As shown in FIG. 1A, this first LIDAR sweep may be captured at a time when there are at least three objects of interest in the collection vehicle's surrounding environment: a first vehicle that is parked to the right of the road at a closer distance to the collection vehicle, a second vehicle that is in the left lane of the road and is driving in the same general direction as the collection vehicle, and a third vehicle that is parked to the right of the road at a further distance from the collection vehicle.

This visualization may be presented to a curator during a labeling process, and as shown, the curator may then label a cluster of 3D data points 101a corresponding to the first vehicle with a 3D bounding box 102a, a cluster of data points 103a corresponding to the second vehicle with a 3D bounding box 104a, and a cluster of data points 105a corresponding to the third vehicle with a 3D bounding box 106a. However, while example visualization 100 shows 3D data points associated with three vehicles, it should be understood that such a visualization may show 3D data points associated with many more objects of interest (which could of various different types) that were in the collection vehicle's surrounding environment during the sweep, and a curator is typically tasked with labeling every such object of interest in the given sweep.

Further, because the collection vehicle and/or certain objects in the collection vehicle's surrounding environment may move from sweep-to-sweep, a curator has typically been required to repeat the foregoing labeling task for every sweep captured by the collection vehicle, which significantly increases how much labor and time is needed to label 3D sensor data captured by collection vehicles. Indeed, in an example where a collection vehicle's LIDAR device performs 10 sweeps per second, the curator would typically be required to repeat the labeling task 10 times for every second of the collection vehicle's mission.

Figure 1B:
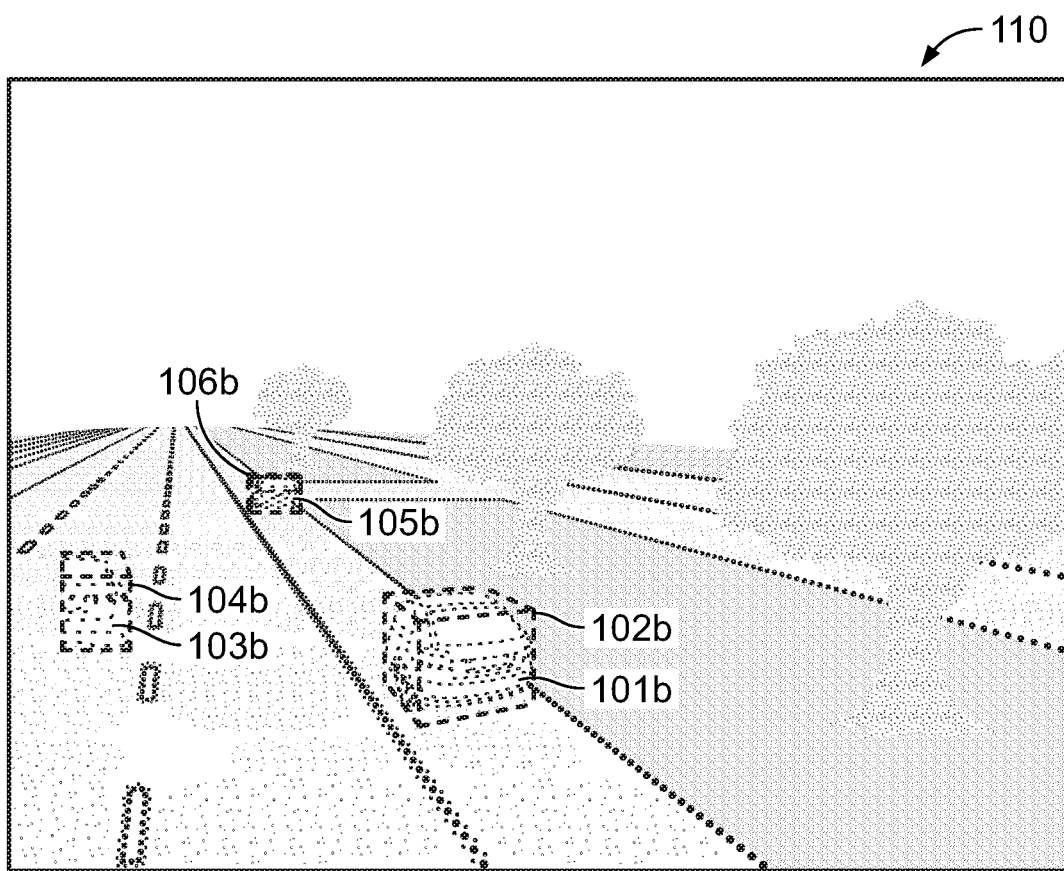
FIG. 1B depicts an example visualization of 3D sensor data from a second LIDAR sweep that may be presented to a curator for labeling.
Figure 1C:
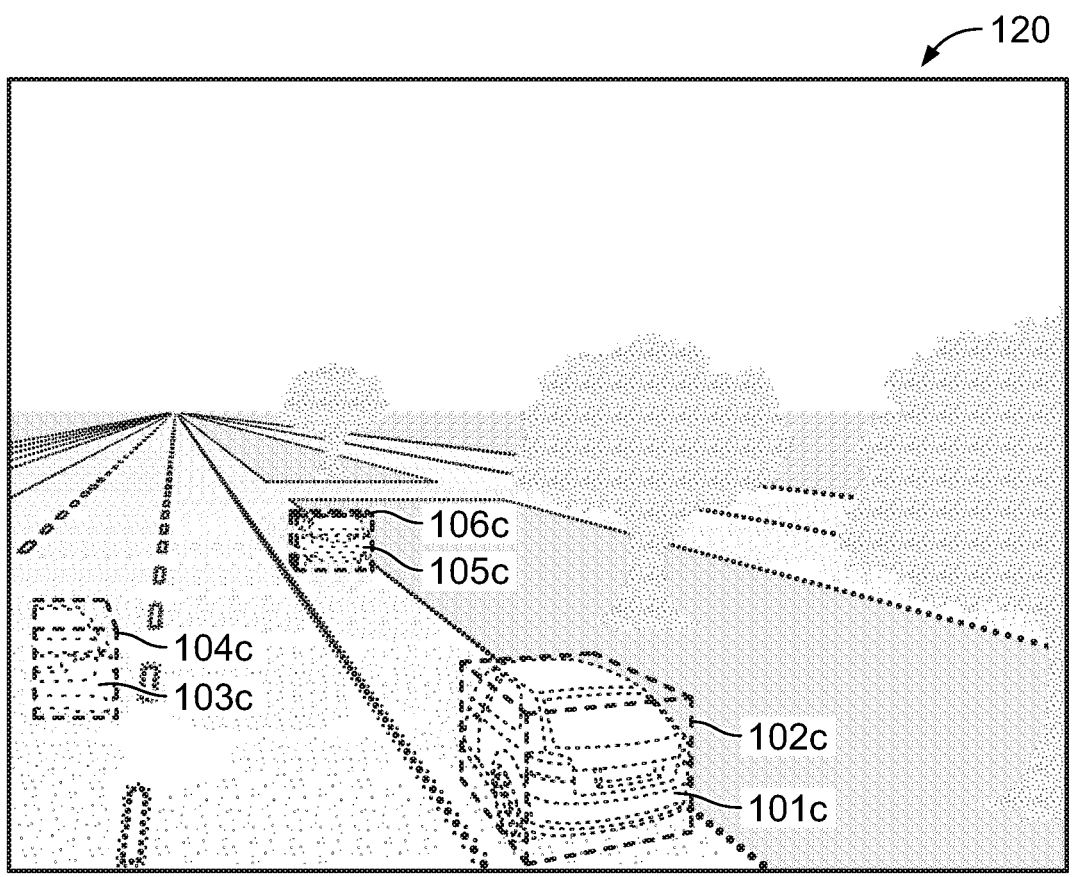
FIG. 1C depicts an example visualization of 3D sensor data from a third LIDAR sweep that may be presented to a curator for labeling.

This need to repeat the labeling process from sweep-to-sweep is illustrated by FIGS. 1B-1C. For instance, FIG. 1B depicts an example visualization 110 of 3D sensor data captured during a second LIDAR sweep of the collection vehicle (not shown), which may be presented to the curator during the labeling process. As shown, a cluster of data points 101b corresponding to the first vehicle is in a different position compared to the cluster of data points 101a from FIG. 1A, a cluster of data points 103b corresponding to the second vehicle is in a different position compared to the cluster of data points 103a from FIG. 1A, and a cluster of data points 105b corresponding to the third vehicle is in a different position compared to the cluster of data points 105a from FIG. 1A. Consequently, the curator typically labels cluster of data points 101b with a new 3D bounding box 102b, labels cluster of data points 103b with a new 3D bounding box 104b, and labels cluster of data points 105b with a new 3D bounding box 106b. And as above, while example visualization 110 shows 3D data points associated with three vehicles, it should be understood that such a visualization may show 3D data points associated with many more objects of interest that need to be labeled by the curator.

Further, FIG. 1C depicts an example visualization 120 of 3D sensor data captured during a third LIDAR sweep of the collection vehicle (not shown), which may be presented to the curator during the labeling process and again shows that clusters of data points 101c, 103c, and 105c associated with the vehicles have changed position and therefore, require new respective bounding boxes 102c, 104c, and 106c.

As noted, the curator may continue to repeat this labeling task for each LIDAR sweep that takes place during the collection vehicle's mission, which may be up to 10 sweeps per second (assuming the collection vehicle captures 3D sensor data at a rate of 10 Hz). In this respect, when a collection vehicle's mission lasts 45 to 60 seconds, the curator is required to repeat this labeling task around 450 to 600 times per mission—and activities such as training object-detection models or creating HD maps for use by vehicles typically require sensor data to be captured and labeled over the course of numerous different missions in order to achieve acceptable accuracy.

In view of the foregoing, it is apparent that the current approach of manually labeling data representative of real-world environments is not well suited for applications that require labeling of such data at a massive scale, such as training object-detection models and/or creating HD maps for use by vehicles designed to operate autonomously.

The example embodiments described herein are generally directed to technological advancements to existing approaches for labeling sensor data captured by vehicles. For instance, one aspect of the present disclosure involves a computer-based labeling process that leverages both 2D sensor data (e.g., image data) and 3D sensor data (e.g., LIDAR data) captured by a collection vehicle while on a mission in a given real-world environment during a given window of time (which may at times be referred to as a "scene") in order to automatically generate 3D labels for objects detected in the real-world environment and then present a curator (or the like) with a single, time-aggregated, 3D visualization of the given real-world environment that includes the generated 3D labels—which provides several advantages over the manual labeling approach described above. For example, by automatically generating 3D labels for objects detected in the real-world environment in the first instance, the disclosed computer-based labeling process may significantly reduce the amount of labor and time it takes to label data that is representative of real-world environments. As another example, by processing and presenting the captured 3D sensor data for a mission in the form of a time-aggregated, 3D visualization rather than a capture-by-capture visualization, the disclosed computer-based labeling process may enable a curator to confirm, modify, and/or add 3D labels for objects detected in the real-world environment once as opposed to on a capture-by-capture basis.

Figure 2A:
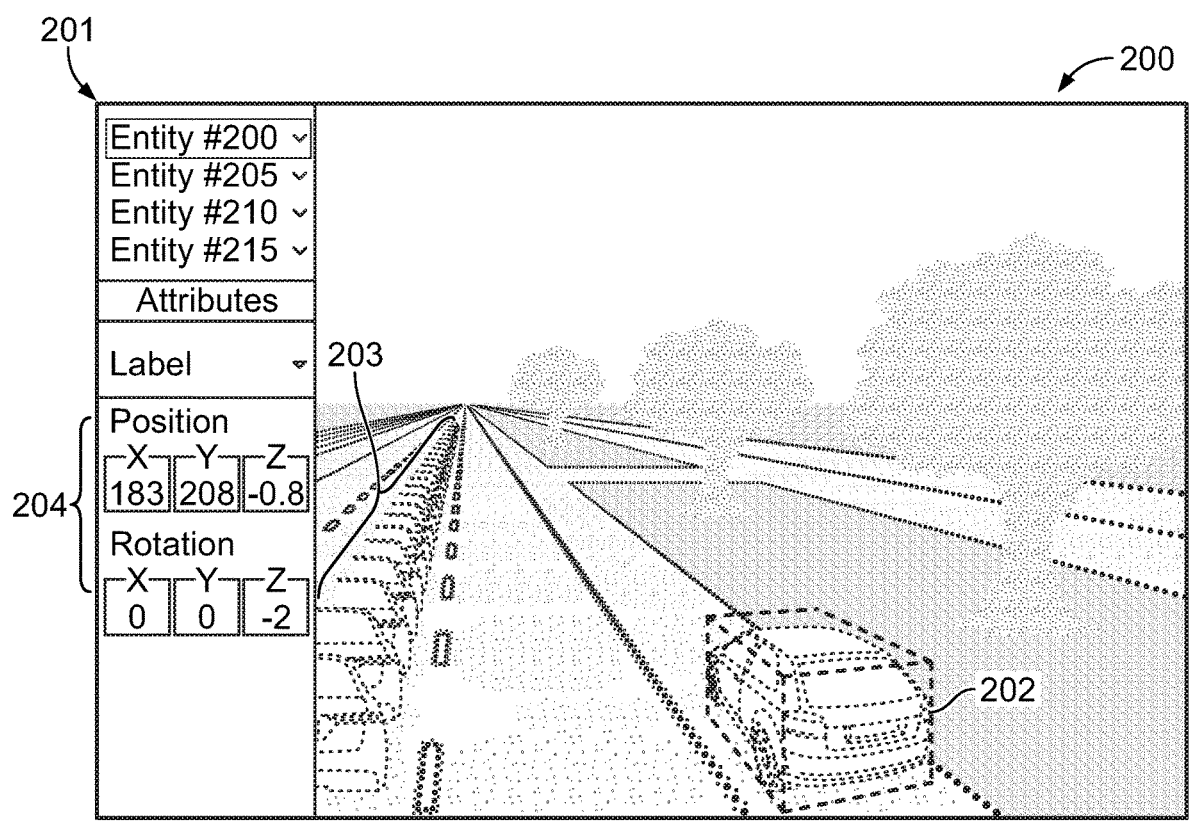
FIG. 2A depicts a first example time-aggregated, 3D visualization from the perspective of a collection vehicle.
Figure 2B:
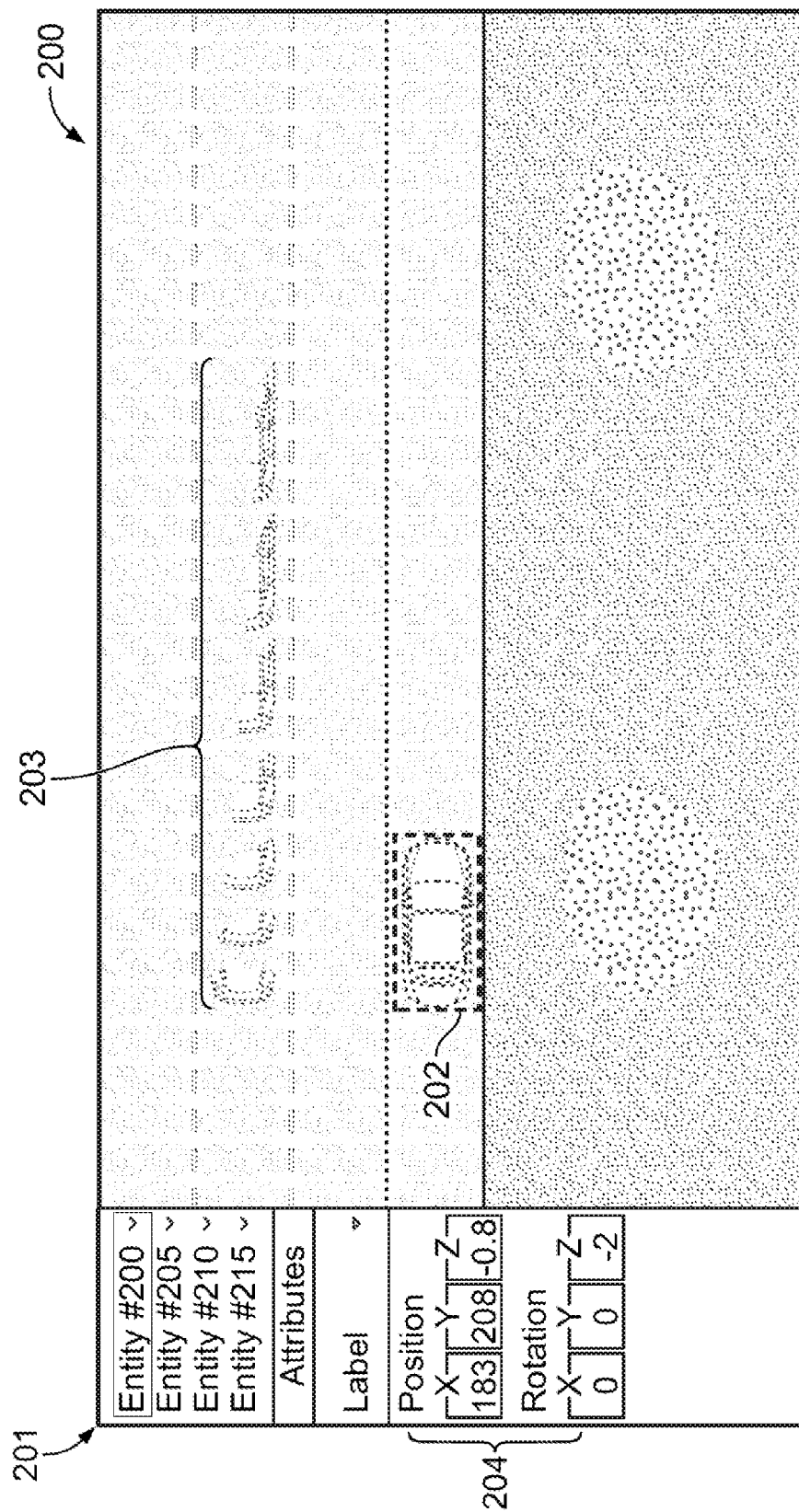
FIG. 2B depicts the first example time-aggregated, 3D visualization from a top-down perspective.

To illustrate, FIGS. 2A-B provide an example time-aggregated, 3D visualization 200 that may be generated based on LIDAR sweeps captured by a collection vehicle (not shown) and then displayed at a curator's client station utilizing the technological innovations disclosed herein, where FIG. 2A shows time-aggregated, 3D visualization 200 from the perspective of the collection vehicle and FIG. 2B shows time-aggregated, 3D visualization 200 from a top-down perspective. As shown in FIGS. 2A-B, time-aggregated, 3D visualization 200 includes a high-fidelity depiction of a real-world environment that includes respective 3D visualizations of various objects of interest perceived by the collection vehicle across some window of time (e.g., during a given mission), including a first vehicle that is parked to the right of the road at a closer distance to the collection vehicle and a second vehicle that is in the left lane of the road and is driving in the same general direction as the collection vehicle. Time-aggregated, 3D visualization 200 was generated in a manner such that each object of interest that was perceived by the collection vehicle across the window of time has a respective, automatically-generated 3D label that can be selectively presented within time-aggregated, 3D visualization 200, such as in response to an input via a control panel 201 that is provided along with time-aggregated, 3D visualization 200. A visualization of one such 3D label that takes the form of a 3D bounding box 202 corresponding to the first vehicle is presented in time-aggregated, 3D visualization 200. After being presented with time-aggregated, 3D visualization 200, a curator may then perform a labeling task for a given object detected in the real-world environment only once for the entire window of time rather than on a capture-by-capture basis, such as by inputting a modification to the classification of the given object and/or a modification to 3D bounding box 202 for the given object (e.g., a modification to the centerpoint x-, y-, and z-coordinate of the 3D bounding box, the width, length, and/or depth of the 3D bounding box, and/or the yaw, pitch, and/or roll for the 3D bounding box) via control panel 201, and the disclosed computer-based labeling process may then automatically apply that modification to the 3D data points associated with the given object found in each different capture of 3D sensor data that was collected during the given window of time.

While the disclosed approach of presenting multiple captures of 3D sensor data (e.g., multiple sweeps of LIDAR data) over a window of time in the form of a time-aggregated, 3D visualization with per-object 3D labels provides several advantages over labeling approaches that present 3D sensor data in the form of capture-by-capture visualizations, the disclosed approach also gives rise to other challenges that are not necessarily faced by existing labeling approaches.

For instance, one such challenge relates to labeling and presenting objects from the collection vehicle's surrounding environment that were in motion during at least some portion of the captured window of time, such as other vehicles, bikes, scooters, pedestrians, etc. Indeed, when an object in the collection vehicle's surrounding environment was in motion, this generally makes the task of labeling and presenting the object in a time-aggregated, 3D visualization more complex for at least a couple of reasons. First, when an object in the collection vehicle's surrounding environment was in motion, the captured 3D data points associated with the object are spread across multiple different positions within the surrounding environment, which makes it more difficult to effectively present such 3D data points in a time-aggregated manner. Second, combined with the fact that the collection vehicle itself is often in motion during its mission, an object in the collection vehicle's surrounding environment that was in motion makes it harder to determine the position of the object vis-à-vis the collection vehicle (and thus the perspective at which the collection vehicle was perceiving the object) from capture-to-capture, which further increases the complexity of labeling and presenting the 3D data points associated with the object in a time-aggregated manner.

These complexities are illustrated in FIGS. 2A-B, which depict that time-aggregated, 3D visualization 200 includes a set of 3D data points 203 associated with the second vehicle that was in motion during some portion of the collection vehicle's mission, which results in the set of 3D data points 203 being spread across multiple different positions within the real-world environment being represented by time-aggregated, 3D visualization 200. As shown, this set of 3D data points 203 is presented in time-aggregated, 3D visualization 200 in a distorted manner that takes the form of a "smear" of multiple partial views of the moving vehicle, which may make it difficult for a curator to evaluate what the object is or how it should be labeled and may also make it difficult to present an automatically-generated 3D label for the object, among other drawbacks.

To address these additional complexities, another aspect of the present disclosure involves a computer-based process for identifying objects in the collection vehicle's surrounding environment that were in motion during at least some portion of a window of time captured by the collection vehicle and then using that identification to help improve the manner in which such objects are labeled and/or presented to a curator. For instance, in some example implementations, the 3D data points associated with moving objects may be presented in the time-aggregated 3D visualization in a way that distinguishes these 3D data points from 3D data points associated with other objects detected in the surrounding environment (e.g., by using particular text, colors, or the like to flag 3D data points associated with the moving objects), perhaps along with options for a curator to selectively "hide" the 3D data points associated with moving objects in a time-aggregated, 3D visualization and/or selectively display only the 3D data points associated with moving objects—which may provide a more effective labeling environment for the curator.

In other implementations, the disclosed computer-based labeling process may additionally reconstruct the 3D data points associated with a moving object throughout the window of time into a single, assembled 3D representation of the moving object, which is then presented as part of the time-aggregated, 3D visualization (e.g., at one or more points along the trajectory of the moving object) in place of the original, "smeared" set of 3D data points associated with the moving object.

Figure 2C:
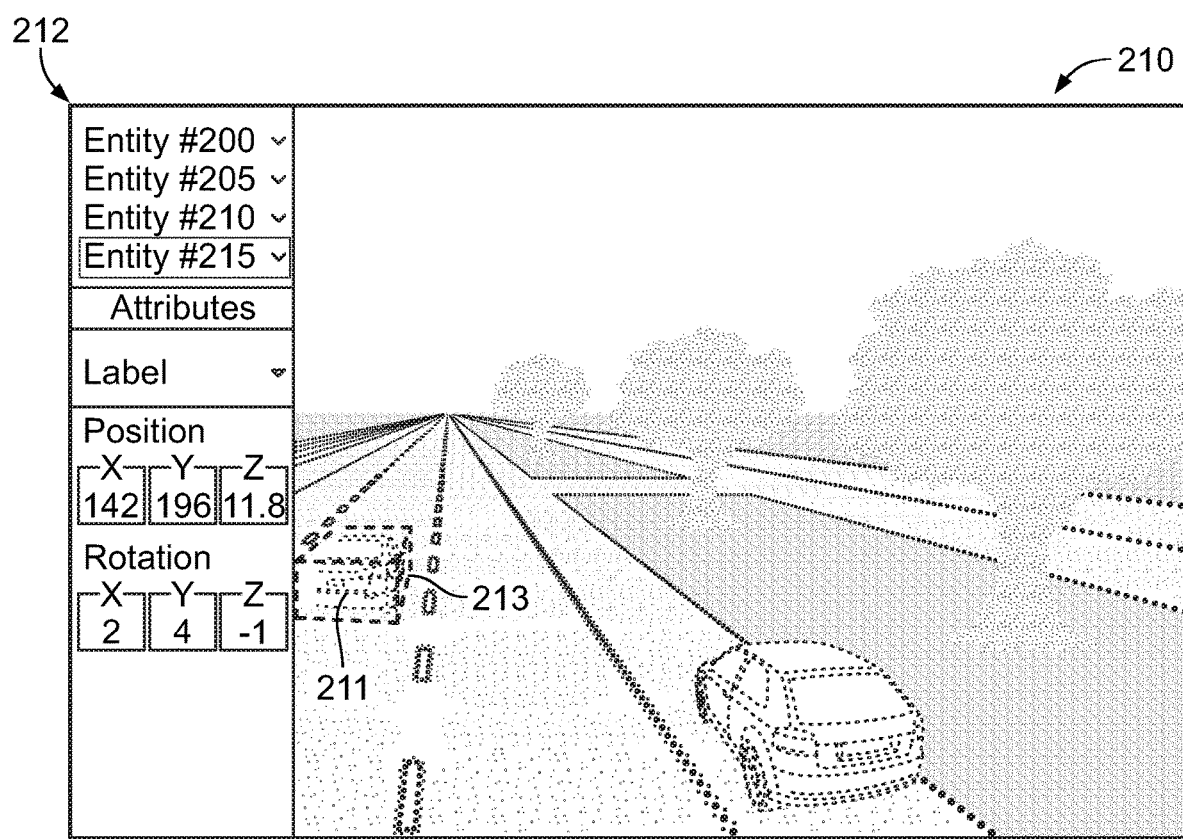
FIG. 2C depicts a second example time-aggregated, 3D visualization from the perspective of a collection vehicle.
Figure 2D:
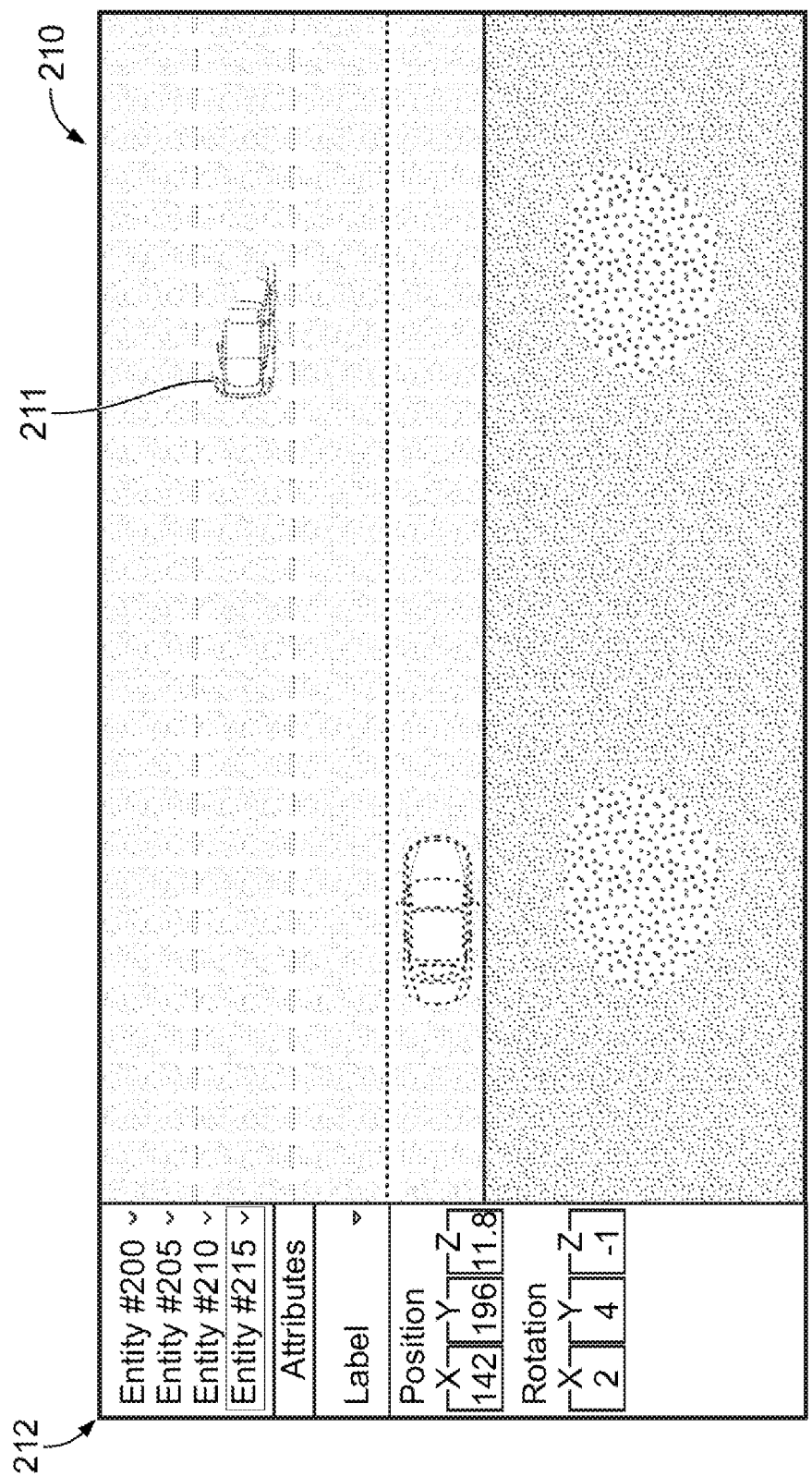
FIG. 2D depicts the second example time-aggregated, 3D visualization from a top-down perspective.

To illustrate the results of such a reconstruction function, FIGS. 2C-D depicts another example time-aggregated, 3D visualization 210 that may be generated based on LIDAR sweeps captured by a collection vehicle (not shown) and then displayed at a curator client station utilizing the technological innovations disclosed herein, where FIG. 2C shows time-aggregated, 3D visualization 210 from the perspective of the collection vehicle and FIG. 2B shows time-aggregated, 3D visualization 210 from a top-down perspective. As shown, time-aggregated, 3D visualization 210 includes a high-resolution depiction of a real-world environment perceived by a collection vehicle during some window of time (e.g., during a given mission) that is similar to time-aggregated, 3D visualization 200 depicted in FIGS. 2A-B, except that the set of 3D data points 203 associated with the moving object are no longer depicted in their original form. Instead, a single, assembled 3D representation 211 of the second vehicle is presented at one point along the perceived trajectory of the moving object during the window of time along with a corresponding, automatically-generated 3D label 213 for the moving object—which may provide an even more effective labeling environment for a curator that improves the curator's ability to evaluate what the moving object is and how it should be labeled.

These as well as various other technological advancements to existing approaches for labeling data representative of real-world environments in which vehicles may operate are described in more detail below.

Figure 3:
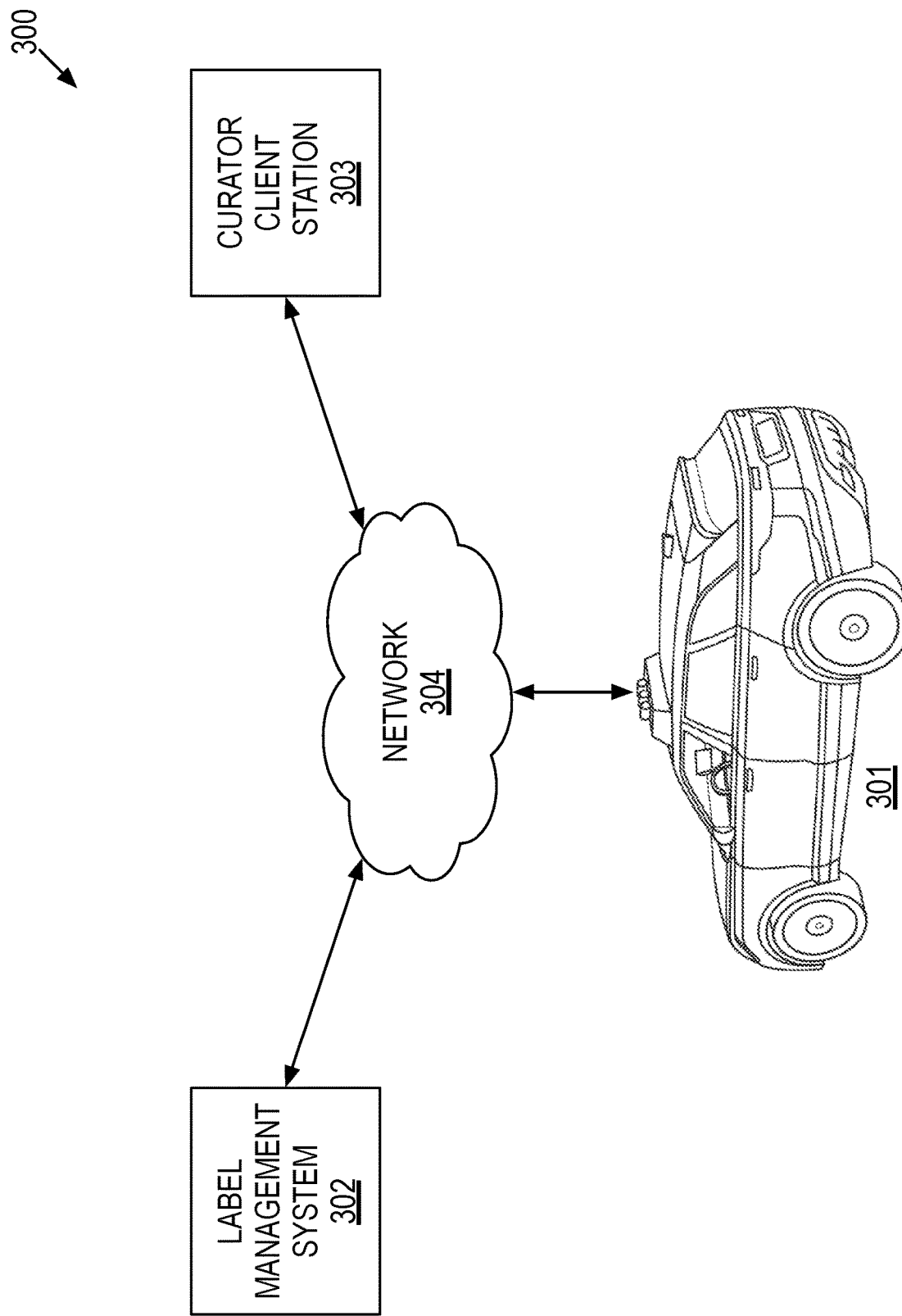
FIG. 3 depicts a simplified block diagram of an example system configuration.

Turning now to FIG. 3, a simplified diagram is provided of an example system configuration 300 in which aspects of the present disclosure may be implemented. As shown, system configuration 300 may include one or more collection vehicles 301, an auto-labeling system 302, and one or more curator client stations 303, at least some combination of which are communicatively coupled via one or more communication networks 304 (e.g., one or more wired and/or wireless communication networks).

Collection vehicle 301 may take the form of any vehicle that is capable of capturing sensor data that is representative of a real-world environment, regardless of whether that vehicle is operated autonomously or is operated manually by a human driver. In practice, collection vehicle 301 may operate to perform missions during which collection vehicle 301 drives through real-world environments where collection vehicle 301 encounters a variety of objects, such as other vehicles, buildings, pedestrians, animals, streets, curbs, traffic signs and lights, trees and other plants, etc., and captures sensor data from which such real-world environments can be analyzed. This sensor data may take various forms.

As one possibility, collection vehicle 301 may be equipped to capture 2D sensor data, which may take the form of 2D image data captured by an array of 2D cameras affixed to collection vehicle 301, among other possible forms of 2D sensor data.

As another possibility, collection vehicle 301 may be equipped to capture 3D sensor data, which may take the form of 3D data captured by one or more 3D sensors affixed to collection vehicle 301, such as LIDAR data captured by one or more LIDAR devices, RADAR data captured by one or more RADAR devices, and/or SONAR data captured by one or more SONAR devices, among other possible forms of 3D sensor data.

In operation, collection vehicle 301 is equipped to capture 2D and 3D sensor data that have a temporal and spatial relationship, which enables systems such as auto-labeling system 302 to leverage both forms of data when processing and analyzing the captured sensor data. As to the temporal relationship, each given sensor data captured by collection vehicle 301 has at least one respective capture time associated with the given sensor data. For example, at a given capture time, collection vehicle 301 may capture a given frame of 2D sensor data (e.g., multiple images) that comprises a respective capture of 2D sensor data (e.g., a respective image) from each of the one or more 2D sensors of collection vehicle 301. Similarly, at a given capture time or over a given range of capture times, collection vehicle 301 may obtain a given capture of 3D sensor data (e.g., a 360° sweep of LIDAR data).

While collection vehicle 301 may capture multiple types of sensor data at any given point in time, in practice, different types of the collection vehicle's sensors may have different capture rates (e.g., each camera may capture 2D sensor data at a rate of 60 images per second while a LIDAR device may capture 3D sensor data at a rate of 10 360°-sweeps per second). In this regard, each capture of 2D sensor data may correspond to a respective capture time in accordance with a first capture rate (e.g., $t_0$, $t_0+\frac{1}{60}^{th}$ sec, $t_0+\frac{2}{60}^{th}$ sec, etc.), and each capture of 3D sensor data may correspond to a respective capture-time range (or singular capture time) in accordance with a second capture rate (e.g., $t_0$ to $t_0+\frac{1}{10}^{th}$ sec, $t_0+\frac{1}{10}^{th}$ sec to $t_0+\frac{2}{10}^{th}$ sec, etc.). Despite these different capture rates, there is temporal relationship between different types of sensor data captured by collection vehicle 301 that is defined by the respective capture times of the sensor data and the respective rates at which that data is captured (e.g., a given 360° sweep of LIDAR data corresponds to 6 images from a given camera).

In addition to the aforementioned temporal relationship, 2D and 3D sensor data captured by collection vehicle 301 may also have a spatial relationship. For instance, collection vehicle 301 may be equipped with an array of 2D cameras that are arranged in a manner that collectively provides a 360° field of view of the collection vehicle's surroundings, where each respective 2D camera captures sensor data from only a portion of that collective field of view. As one possible example to illustrate, collection vehicle 301 may include an array of 6 (or perhaps 7) cameras that are each tasked with capturing 2D images for a respective portion of the 360° field of view of the collection vehicle's surroundings. Collection vehicle 301 may be further equipped with a LIDAR device that, for each given sweep, rotates and captures 3D sensor data along a 360° field of view of the collection vehicle's surroundings. Thus, a capture of 2D sensor data by a given 2D camera may correspond to only a portion of a capture of 3D sensor data (e.g., an image captured by a given 2D camera may correspond to only a particular portion of the 360° LIDAR sweep). However, as a result of a calibration process for collection vehicle 301, a spatial relationship can be established between captured 2D and 3D sensor data such that an object identified in the 2D space can be mapped into the 3D space and vice versa.

Further, collection vehicle 301 may be equipped to provide captured sensor data to auto-labeling system 302 and receive HD maps and/or trained object-detection models from auto-labeling system 302 via one or more communication networks 304. Additional details regarding collection vehicle 301 are described later with reference to FIG. 9.

Auto-labeling system 302 may include one or more computing systems that have been configured to perform a variety of functions disclosed herein related to processing and labeling sensor data captured by collection vehicles 301. For instance, auto-labeling system 302 may be configured to (i) receive 2D sensor data (e.g., image data) and 3D sensor data (e.g., LIDAR data) that was captured by a collection vehicle 301 while on a mission in a given real-world environment during a given window of time, (ii) automatically generate 3D labels for objects detected in the given real-world environment, (iii) generate a single, time-aggregated, 3D visualization of the given real-world environment that includes the generated 3D labels, (iv) present the generated time-aggregated, 3D visualization to a curator via a curator client station 303, and (v) update previously-generated 3D labels and/or generate new 3D labels based on curator input, among other functions. Additional functional details regarding auto-labeling system 302 are described later with reference to FIGS. 4A-4B, and additional structural details regarding auto-labeling system 302 are described later with reference to FIG. 10.

Each curator client station 303 may include one or more computing devices (e.g., laptops, desktops, tablets, etc.) that are configured to perform a variety of functions disclosed herein related to processing and labeling sensor data captured by collection vehicles 301. For instance, curator client station 303 may be configured to (i) receive visualization data from auto-labeling system 302 that defines a time-aggregated, 3D visualization representing a given real-world environment as perceived by a collection vehicle 301 during a given window of time and perhaps also previously-generated 3D labels for objects detected in the real-world environment, (ii) render the time-aggregated, 3D visualization (and perhaps also the previously-generated 3D labels) on a display such that a curator can confirm, modify, and/or add 3D labels for objects detected in the real-world environment, (iii) receive one or more annotation inputs from the curator that reflect a labeling action for an object (e.g., confirmation of a previously-generated 3D label for an object, a change to a previously-generated 3D label for an object, or an addition of a new 3D label for an object), and (iv) provide an indication of the one or more annotation inputs to auto-labeling system 302 such that auto-labeling system 302 can update the previously-generated 3D labels for the objects detected in the real-world environment. To these ends, curator client station 303 may include one or more input devices (e.g., a keyboard and mouse, touch interface, etc.), a display, one or more communication interfaces, at least one processor, and software in the form of program instructions that are executable by the at least one processor such that curator client station 303 can perform the curator-station functions described herein.

Example functions that an auto-labeling system may be configured to perform will now be discussed in further detail. For purposes of example and illustration only, the example functions are described in the context of example system configuration 300 of FIG. 3 and as being performed by auto-labeling system 302. To help describe some of these functions, flow diagrams may also be referenced to describe combinations of functions that may be performed. In some cases, each flow-diagram block may represent a module or portion of program code that includes instructions that are executable by at least one processor to implement specific logical functions or steps in a process. The program code may be stored on any type of computer-readable medium, such as non-transitory computer-readable media. Moreover, a person of ordinary skill in the art will appreciate that the blocks shown in the flow diagrams may be rearranged into different orders, combined into fewer blocks, separated into additional blocks, and/or removed based upon the particular embodiment.

Figure 4A:
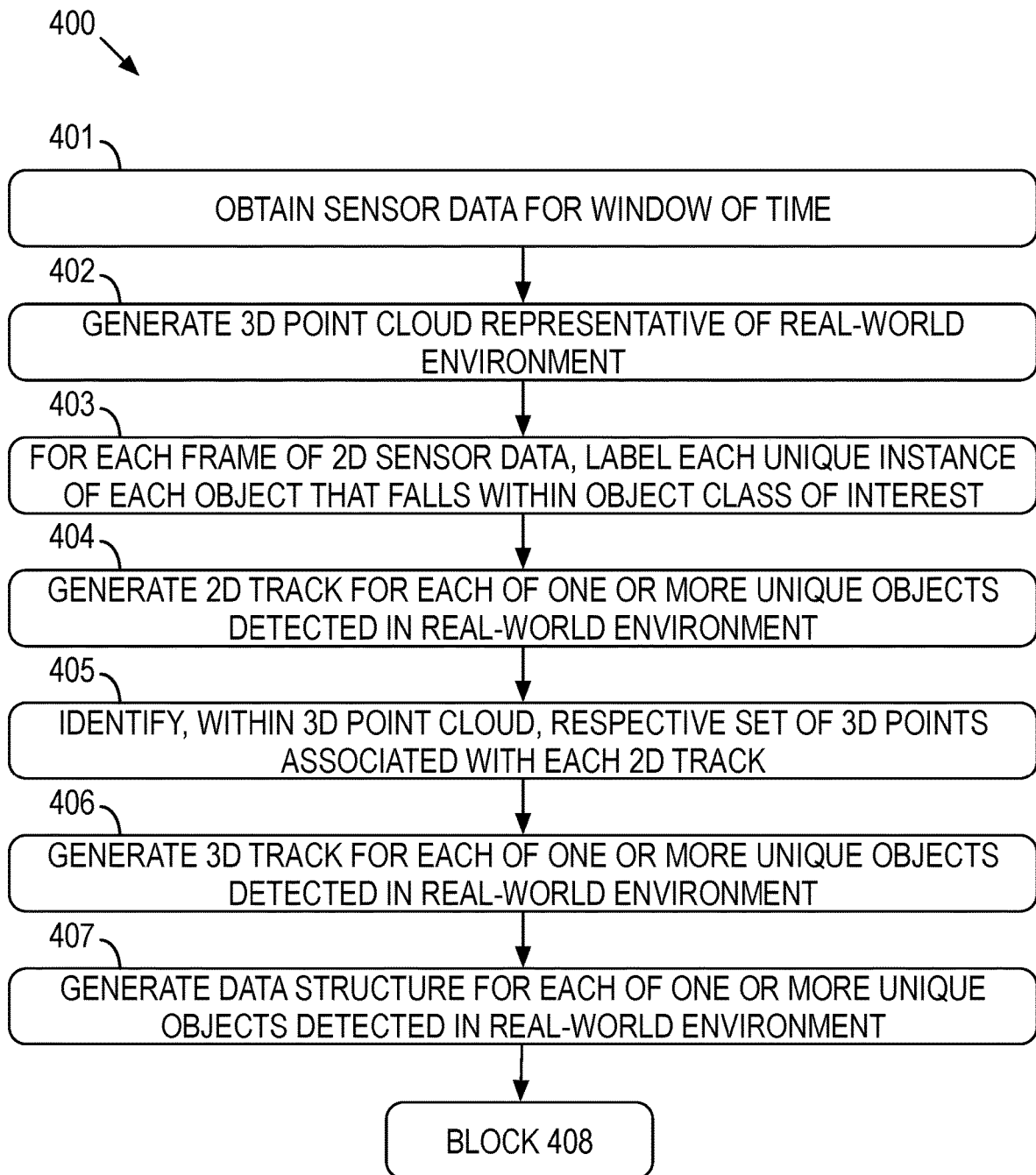
FIG. 4A depicts a flow diagram of example functions that an auto-labeling system may be configured to perform.
Figure 4B:
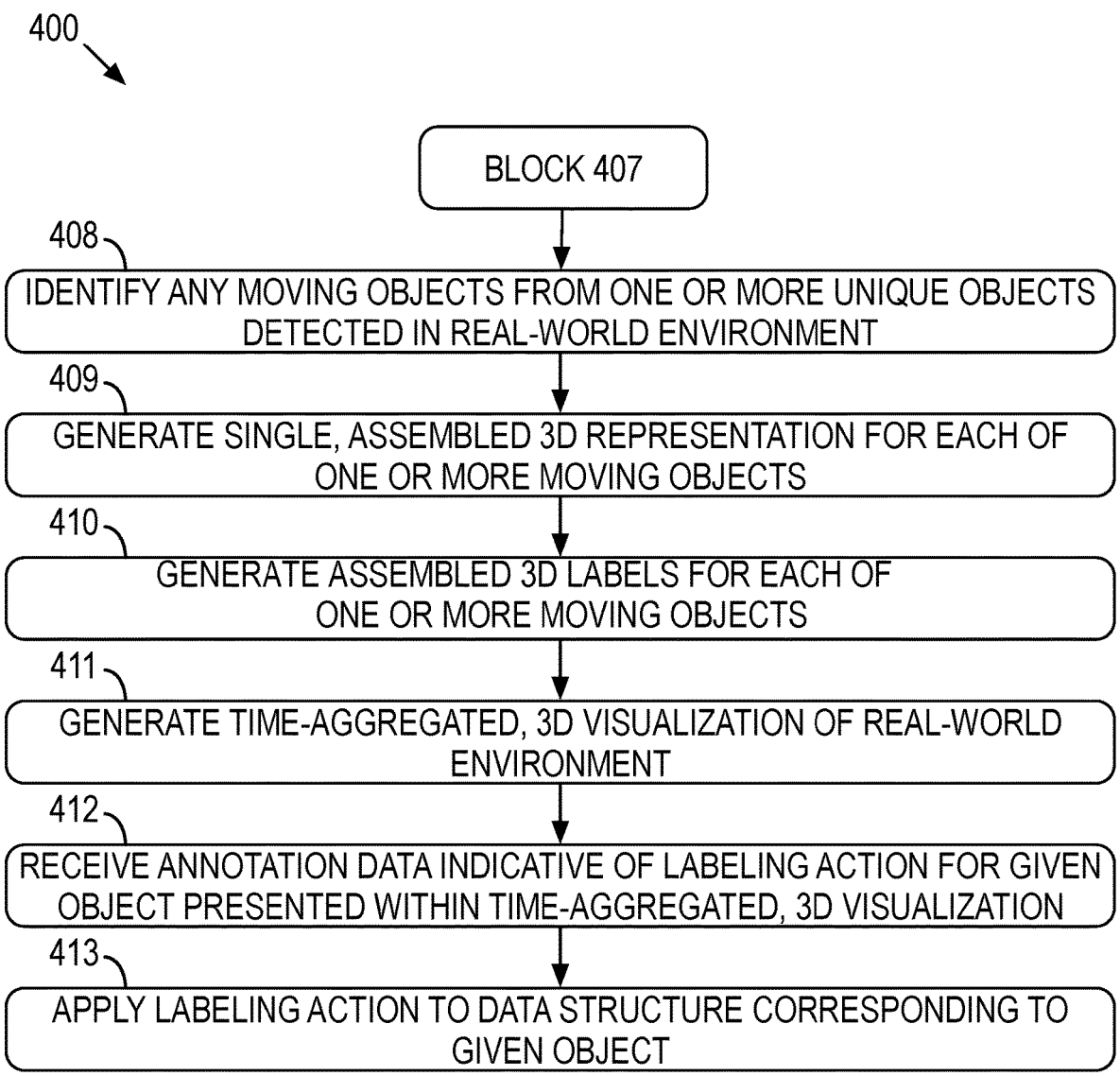
FIG. 4B depicts a flow diagram of further example functions that an auto-labeling system may be configured to perform.

Turning now to flow diagram 400 of FIGS. 4A-4B, at block 401, auto-labeling system 302 may obtain sensor data captured by collection vehicle 301 while operating in a given real-world environment during a given window of time. In practice, auto-labeling system 302 may perform this function in a variety of manners.

As one possibility, auto-labeling system 302 may have previously received sensor data from collection vehicle 301, such as after collection vehicle 301 performed (or perhaps during the collection vehicle's performance of) a mission, in which case auto-labeling system 302 may obtain the sensor data captured during the given window of time from data storage or the like. In practice, the data storage may be local to auto-labeling system 302 or may be part of an external data source that previously received the sensor data captured by collection vehicle 301 during its mission. In some implementations, auto-labeling system 302 may obtain the sensor data in response to receiving a curation task input (e.g., from curator client station 303) that identifies at least (i) a particular collection vehicle 301, (ii) a start timestamp, and (iii) an end timestamp, where the start and end timestamps define the given window of time for which auto-labeling system 302 obtains sensor data captured by the particular collection vehicle 301. Auto-labeling system 302 may obtain the sensor data based on other triggers as well.

As another possibility, auto-labeling system 302 may obtain the sensor data from collection vehicle 301 while collection vehicle 301 is performing a mission, perhaps in real time (e.g., via one or more wireless wide-area networks (WANs) of communication network 304). Auto-labeling system 302 may obtain sensor data captured by collection vehicle 301 in other manners as well.

In any case, the obtained sensor data may include at least 2D sensor data (e.g., image data) and 3D sensor data (e.g., LIDAR, RADAR, and/or SONAR data) that collection vehicle 301 captured during the given window of time. In practice, the 2D sensor data may be on a frame-by-frame basis, where each frame of 2D sensor data corresponds to a given capture time within the given window of time and includes respective 2D sensor data (e.g., a respective image) captured by one or more 2D sensors (e.g., cameras) of collection vehicle 301 at that given capture time. In turn, the 3D sensor data may be captured on a sweep-by-sweep basis (e.g., corresponding to 360° rotations by a LIDAR device of collection vehicle 301), where each sweep of 3D sensor data corresponds to a given range of capture times that fall within the given window of time and includes respective 3D sensor data captured by one or more sensors (e.g., a LIDAR device) of collection vehicle 301. The given range of capture times may be defined by a capture time at which the given sweep started and a capture time at which the given sweep stopped. In some cases, a given sweep of 3D sensor data may correspond to a single capture time, such as the start or stop capture time of the given sweep.

As discussed before, each type of sensor data generally provides information regarding the given real-world environment and objects contained therein that collection vehicle 301 encountered during its mission. In practice, each type of sensor data may also include data (e.g., metadata) that identifies at least (i) a capture time or range of capture times corresponding to when collection vehicle 301 captured the given type of sensor data and (ii) an identifier of the particular sensor of collection vehicle 301 that captured the given type of sensor data (e.g., an identifier of a particular camera, LIDAR device, etc.), among other possibilities.

In practice, because collection vehicle 301 captures 3D sensor data on a sweep-by-sweep basis as collection vehicle 301 moves through the given real-world environment, each sweep of 3D sensor data is reflected in terms of a "relative" coordinate system that specifies respective positions of objects detected in the environment relative to the position of collection vehicle 301 at the time of the given sweep, as opposed to specifying the respective positions of the objects detected in the environment in accordance with an "absolute" coordinate system that does not change from sweep to sweep. However, as discussed before, auto-labeling system 302 seeks to generate visualizations of 3D sensor data representing given real-world environments in a time-aggregated manner (e.g., to provide a more improved and efficient labeling process), which generally requires the respective positions of objects detected by collection vehicle 301 to be represented in terms of with an absolute coordinate system such that 3D sensor data from each sweep can be aggregated together. To represent 3D sensor data in terms of an absolute coordinate system, auto-labeling system 302 may be configured to determine for the trajectory of collection vehicle 301 through the given real-world environment during the given window of time and then use this trajectory as a basis for translating each capture of 3D sensor data from a relative coordinate system to an absolute coordinate system (e.g., by "backing out" the position of collection vehicle 301 associated with each capture of 3D sensor data).

In this respect, at block 402, auto-labeling system 302 may generate a time-aggregated, 3D point cloud that is representative of the real-world environment perceived by collection vehicle 301 during the given window of time based at least on (i) sensor data captured by collection vehicle 301 during the given window of time, which is obtained at block 401, and (ii) data indicating a trajectory of collection vehicle 301 during the given window of time (e.g., data indicating the collection vehicle's trajectory state at each of various time points throughout the given window of time).

The particular sensor data that is used to generate the time-aggregated, 3D point cloud may take any of a variety of forms. As one possibility, such sensor data may include 3D sensor data captured by collection vehicle 301 during the given window of time, such as LIDAR data. As another possibility, such sensor data may include 2D sensor data captured by collection vehicle 301 during the given window of time, such as image data. The sensor data that is used to generate the time-aggregated, 3D point cloud may take other forms as well.

Further, the data indicating the trajectory of collection vehicle 301 during the given window of time may be derived in any of a variety of manners and take any of a variety of forms. As one possibility, auto-labeling system 302 may derive the data indicating the trajectory of collection vehicle 301 by applying a simultaneous localization and mapping (SLAM) technique to sensor data captured by collection vehicle 301 during the given window of time, which results in the generation of localization data that is indicative of the trajectory of collection vehicle 301 during the given window of time. For example, auto-labeling system 302 may apply a SLAM technique to various sensor data captured by collection vehicle 301 during the given window of time, including but limited to 2D sensor data, 3D sensor data, sensor data from an inertial measurement unit (IMU) of collection vehicle 301, etc., which may result in the simultaneous generation of (i) a map of the collection vehicle's surrounding environment during the given window of time and (ii) localization data that is indicative of the collection vehicle's trajectory within that constructed map across the given window of time. In this respect, the localization data that is indicative of the trajectory of collection vehicle 301 during the given window of time may take the form of a set of time-specific "poses" of collection vehicle 301 that each indicate a position and orientation state of collection vehicle 301 at a different time point during the given window of time, among other possibilities.

The data indicating the trajectory of collection vehicle 301 during the given window of time may be derived in other manners and/or take other forms as well—including the possibility that such data may indicate additional aspects of the collection vehicle's state such as velocity and acceleration, among other possibilities.

Further yet, the task of generating the time-aggregated, 3D point cloud based on the sensor data and the data indicating the collection vehicle's trajectory may take any of a variety of forms. As one possibility, auto-labeling system 302 may (i) utilize the data indicating the trajectory of collection vehicle 301 during the given window of time to translate the 3D sensor data obtained at block 401 into a common frame of reference, which may involve aligning the capture-specific 3D sensor data to an absolute coordinate system, and (ii) compile (e.g., "stitch") the translated 3D sensor data into a time-aggregated, 3D point cloud that represents the given real-world environment perceived by collection vehicle 301 across the entire window of time (while also maintaining the respective capture times of the capture-specific 3D sensor data for future reference). Auto-labeling system 302 may generate time-aggregated, 3D point clouds in other manners as well.

The task of generating the time-aggregated, 3D point cloud may involve various other functions as well. As one possibility, the task of generating the 3D point cloud may additionally involve classifying the 3D data points in the time-aggregated, 3D point cloud, which may be carried out in various manners. For instance, auto-labeling system 302 may classify the 3D data points in the time-aggregated, 3D point cloud by applying semantic segmentation to the 2D sensor data and then using the relationship between 2D and 3D sensor data to apply the assigned classes to the 3D data points. In one particular example, auto-labeling system 302 may (i) obtain each frame of 2D sensor data (e.g., image data) captured by collection vehicle 301 during the given window of time, (ii) apply, to each obtained frame of 2D sensor data, one or more semantic segmentation techniques (e.g., FCN, FastFCN, etc.) for one or more object classes of interest (e.g., vehicles, bicycles, animals, pedestrians, plants, buildings, streets, curbs, stop lights, traffic signs, posts/poles, etc.) and thereby identify 2D sensor data points corresponding to objects falling within one of the object classes of interest, (iii) generate, on a frame-by-frame basis, class-specific 2D object masks for the identified objects of the given frame, where each class-specific 2D object mask is representative of a given identified object at a given capture time within the given window of time and assigned to a specific object class, and (iv) for each respective class-specific 2D object mask, use the relationship between the 2D and 3D sensor data to identify a respective set of one or more 3D data points in the time-aggregated, 3D point cloud that correspond to the respective 2D object mask and then assign the identified set of one or more 3D data points to the same specific object class to which the respective 2D object mask is assigned. Auto-labeling system 302 may classify 3D point cloud data based on semantic segmentation in other manners as well.

Figure 5:
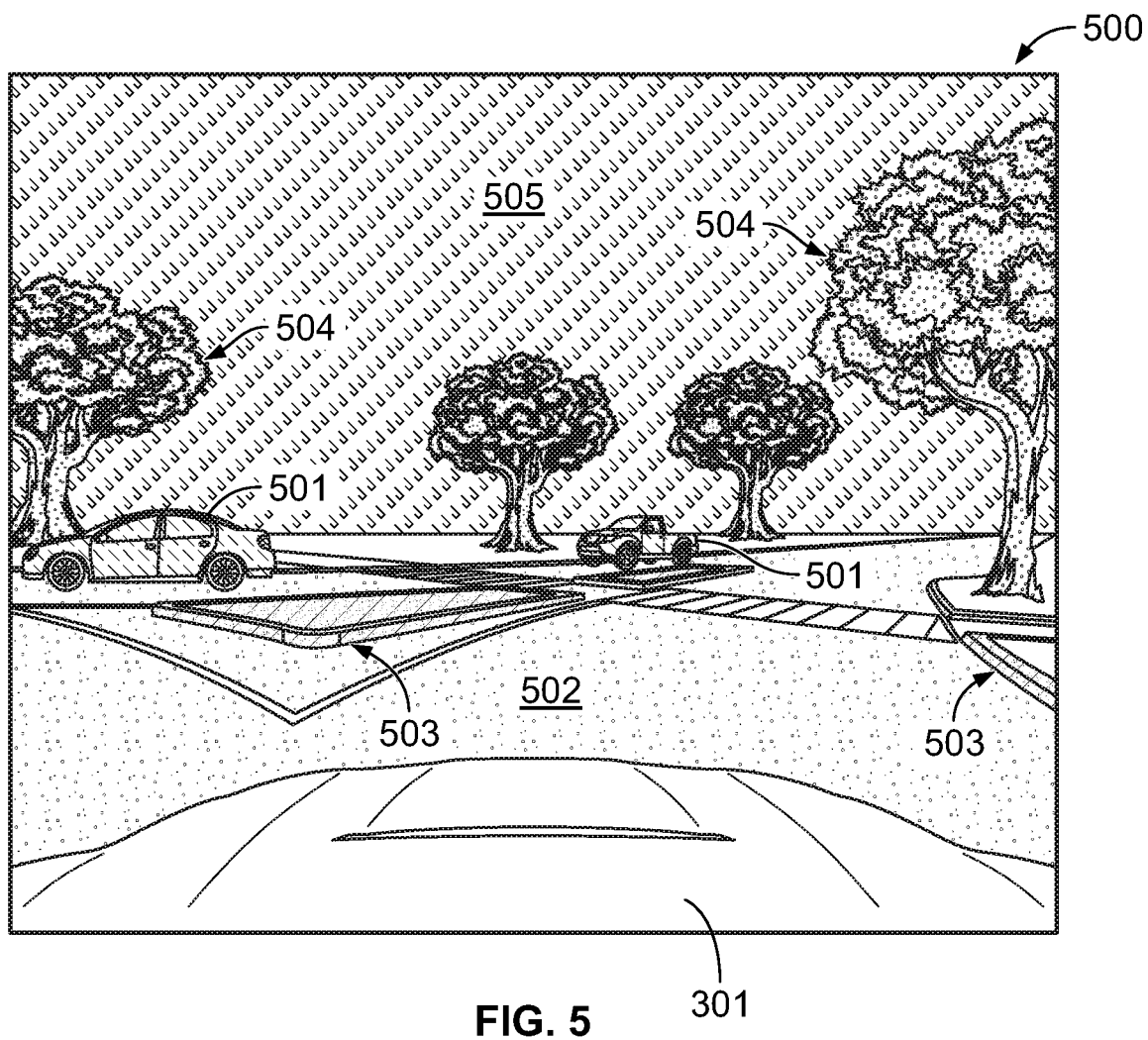
FIG. 5 depicts a simplified illustration of an example of semantic segmentation.

To illustrate semantic segmentation, FIG. 5 provides a simplified illustration of an example image 500 captured by collection vehicle 301. As shown, in this example, auto-labeling system 302 identified (i) multiple pixels corresponding to a "vehicle" classification and labeled these pixels with a vehicle 2D object mask 501, (ii) multiple pixels corresponding to a "street" classification and labeled these pixels with a street 2D object mask 502, (iii) multiple pixels corresponding to a "curb" classification and labeled these pixels with a curb 2D object mask 503, (iv) multiple pixels corresponding to a "plant" classification and labeled these pixels with a plant 2D object mask 504, and (v) multiple pixels corresponding to a "sky" classification and labeled these pixels with a sky 2D object mask 505.

As another possibility, the task of generating the time-aggregated, 3D point cloud may additionally involve "colorizing" the data points in the 3D point cloud by assigning respective colors to the 3D data points based on the colors included in the corresponding 2D image data. As one particular example, auto-labeling system 302 may colorize each respective data point in the 3D point cloud by (i) identifying at least one frame of 2D image data captured by collection vehicle 301 that corresponds to the respective 3D data point, (ii) identifying a given portion of the at least one frame of 2D image data (e.g., a cluster of one or more 2D pixels) that specifically corresponds to the respective 3D data point, and (iii) assigning a color of the given portion of the at least one frame of 2D image data to the respective 3D data point. Auto-labeling system 302 may assign respective colors to the 3D point cloud data based on colors from corresponding 2D sensor data in other manners as well.

As yet another possibility, the task of generating the time-aggregated, 3D point cloud may involve filtering the 3D point cloud to remove certain 3D data points that are not useful and/or unnecessary for the subsequent functions of flow diagram 400. In this respect, the 3D point cloud as it exists prior to filtering may be considered a "preliminary" 3D point cloud, and then, the filtered 3D point cloud may be considered the "final" 3D point cloud for purposes of the subsequent functions of flow diagram 400.

In practice, filtering the 3D point cloud may help reduce the amount of compute resources that are required for subsequent functions and/or increase the speed at which subsequent functions are performed. Indeed, in some instances, filtering the 3D point cloud in the manner described herein may enable auto-labeling system 302 to remove a large percentage of the data points from the 3D point cloud (e.g., up to 90%), which may significantly improve the auto-labeling system's ability to perform the subsequent functions of flow diagram 400 that make use of the 3D point cloud. Other technological advantages that result from this function may also exist.

The function of filtering the 3D point cloud may take any of various forms. As one possibility, auto-labeling system 302 may perform this filtering function by applying one or some combination of (i) a ground filter, (ii) an outlier filter, or (iii) an irrelevant-objects filter, among other possible filters. In practice, auto-labeling system 302 may apply each of these filters in a variety of manners.

For instance, a ground filter may operate to mask 3D point cloud data that is identified as being associated with a ground feature (e.g., streets, curbs, lane lines, cross walks, etc.) within the given real-world environment that collection vehicle 301 encountered during its mission. In one example implementation, auto-labeling system 302 may apply a ground filter by (i) identifying, based on the preliminary 3D point cloud and the 2D sensor data from block 401, any 3D point cloud data that corresponds to a ground feature, such as by utilizing semantic segmentation techniques as discussed above, and (ii) removing the identified 3D point cloud data from the preliminary 3D point cloud. Other types and manners of applying ground filters are also possible.

An outlier filter may operate to mask 3D point cloud data that appears to be "outlier" data relative to other data in the preliminary 3D point cloud. In one example implementation, auto-labeling system 302 may apply an outlier filter by (i) identifying, based at least on the preliminary 3D point cloud, any 3D data points that satisfy one or more outlier conditions, such as a data point being located outside of a predetermined distance from other data points, and (ii) removing the identified 3D data points from the preliminary 3D point cloud. In another example implementation, an outlier filter may be based on 3D shape models for certain types of objects of interest, in which case auto-labeling system 302 may apply such an outlier filter by performing the following functions for one or more objects detected in the sensor data: (i) overlaying a 3D shape model for a given type of object onto a set of 3D data points identified as being associated with a detected object of the given type (where the detected object's associated set of 3D data points may be identified in any of the manners described herein), (ii) determining that certain 3D data points associated with the detected object fall outside of the 3D shape model, and then (iii) removing these outlier 3D data points from the preliminary 3D point cloud. Other types of and manners of applying outlier filters are also possible.

An irrelevant-objects filter may operate to mask 3D point cloud data that is identified as being "not of interest" for a particular curation task, such as data that is located outside of a given area of interest or data associated with certain object classes. As one particular example, auto-labeling system 302 may apply an area-based irrelevant-objects filter by (i) identifying a given semantic map associated with the given real-world environment in which collection vehicle 301 operated during the given window of time, where the given semantic map may include an information map overlaid on a geometric map associated with the given real-world environment, (ii) creating a cropped version of the given semantic map that excludes map features outside of a predetermined distance from the trajectory of collection vehicle 301 during the given window of time (e.g., 50 meters), (iii) based on the cropped version of the semantic map, designating any 3D point cloud data that falls outside of the cropped version of the semantic map as being associated with an "irrelevant object," (iv) for any of the designated 3D point cloud data that is proximate to an edge of the cropped version of the given semantic map, designate any additional 3D point cloud data that (a) falls inside of the cropped version of the semantic map and (b) is associated with an irrelevant object that is partially outside of the cropped version of the semantic map as also being associated with an "irrelevant object," and (v) removing any 3D point cloud data designated as being associated with an "irrelevant object" from the preliminary 3D point cloud.

Figure 6A:
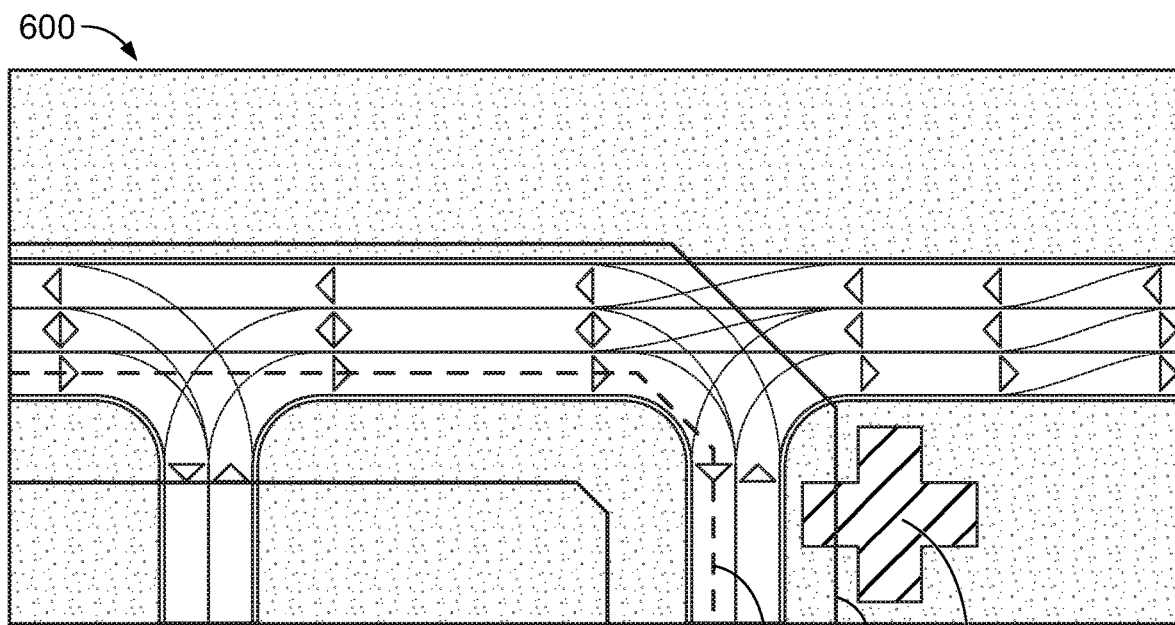
FIG. 6A depicts a view of a portion of an example semantic map.
Figure 6B:
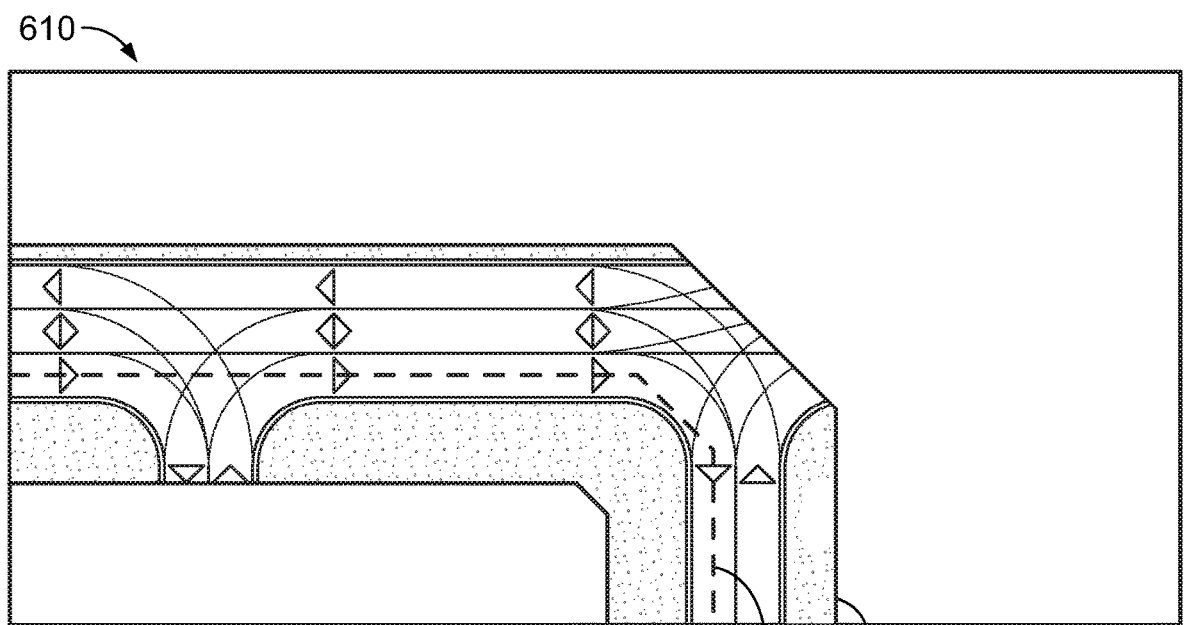
FIG. 6B depicts a view of a cropped version of the portion of the example semantic map of FIG. 6A.

As one illustrative example, FIG. 6A provides a simplified illustration of a bird's eye view of a portion of an example semantic map 600 associated with an example real-world environment in which collection vehicle 301 may have been operating during the given window of time. Semantic map 600 is shown with a trajectory line 601 that represents the collection vehicle's trajectory through the depicted portion of semantic map 600 and a cropping polygon 602 that was defined by extending away from trajectory line 601 a predetermined distance. Cropping polygon 602 circumscribes a portion of semantic map 600 that is to be included in a cropped version of semantic map 600. In this example, an edge object 603 (e.g., a building, gas station, etc.) is partially located within cropping polygon 602. As shown in FIG. 6B, which provides an illustration of a cropped version 610 of semantic map 600 of FIG. 6A, map features that fall outside of cropping polygon 602 were removed from semantic map 600 and map features like edge object 603 that fall only partially inside of cropping polygon 602 were also removed.

As another particular example of an irrelevant-objects filter, auto-labeling system 302 may apply an object-class-based irrelevant-objects filter in a similar manner as the aforementioned ground filter except that any 3D point cloud data that is identified as being associated with other object classes (e.g., plants, etc.) is removed from the preliminary 3D point cloud. Auto-labeling system 302 may apply other types of filters and/or may apply filters in other manners as well.

The task of generating the time-aggregated, 3D point cloud may involve various other functions and/or take various other forms as well.

Once the time-aggregated, 3D point cloud has been generated, auto-labeling system 302 may then identify and label data points within the 3D point cloud that are associated with objects of interest detected in the given real-world environment during the given window of time. In practice, auto-labeling system 302 may achieve this task in a variety of manners, and one possible sequence of functions that may be carried out to achieve this task is shown in FIG. 4 beginning at block 403.

In particular, at block 403, auto-labeling system 302 may identify and label, within each frame of 2D sensor data captured during the given window of time, each unique instance of each object that falls within one or more object classes of interest. Some example object classes of interest may include vehicles, bicycles, animals, pedestrians, plants, buildings, streets, curbs, lane lines, stop lights, traffic signs, posts/poles, etc. In practice, auto-labeling system 302 may detect unique instances of objects that fall within certain classes of interest in a variety of manners.

As one possibility, auto-labeling system 302 may detect unique instances of objects within certain classes of interest based on instance segmentation. For example, auto-labeling system 302 may, for each frame of 2D sensor data (e.g., image data) captured by collection vehicle 301 during the given window of time (i) apply, to a given frame of 2D sensor data, one or more instance segmentation techniques (e.g., Mask R-CNN, DeepMask, etc.) for one or more object classes of interest, (ii) by virtue of applying the one or more instance segmentation techniques, identify, within the given frame of 2D sensor data, each unique instance of each object falling within one of the object classes of interest, and then (iii) generate, for the given frame of 2D sensor data, a respective set of 2D labels that includes a respective 2D label for each unique instance of each object identified in the frame, where each such 2D label is representative of a given detected object as perceived at a given capture time within the given window of time. In this respect, each 2D label may take various forms, examples of which may include one or both of a 2D bounding box or a 2D object mask that is associated with an indication of a classification assigned to the object.

Figure 7:
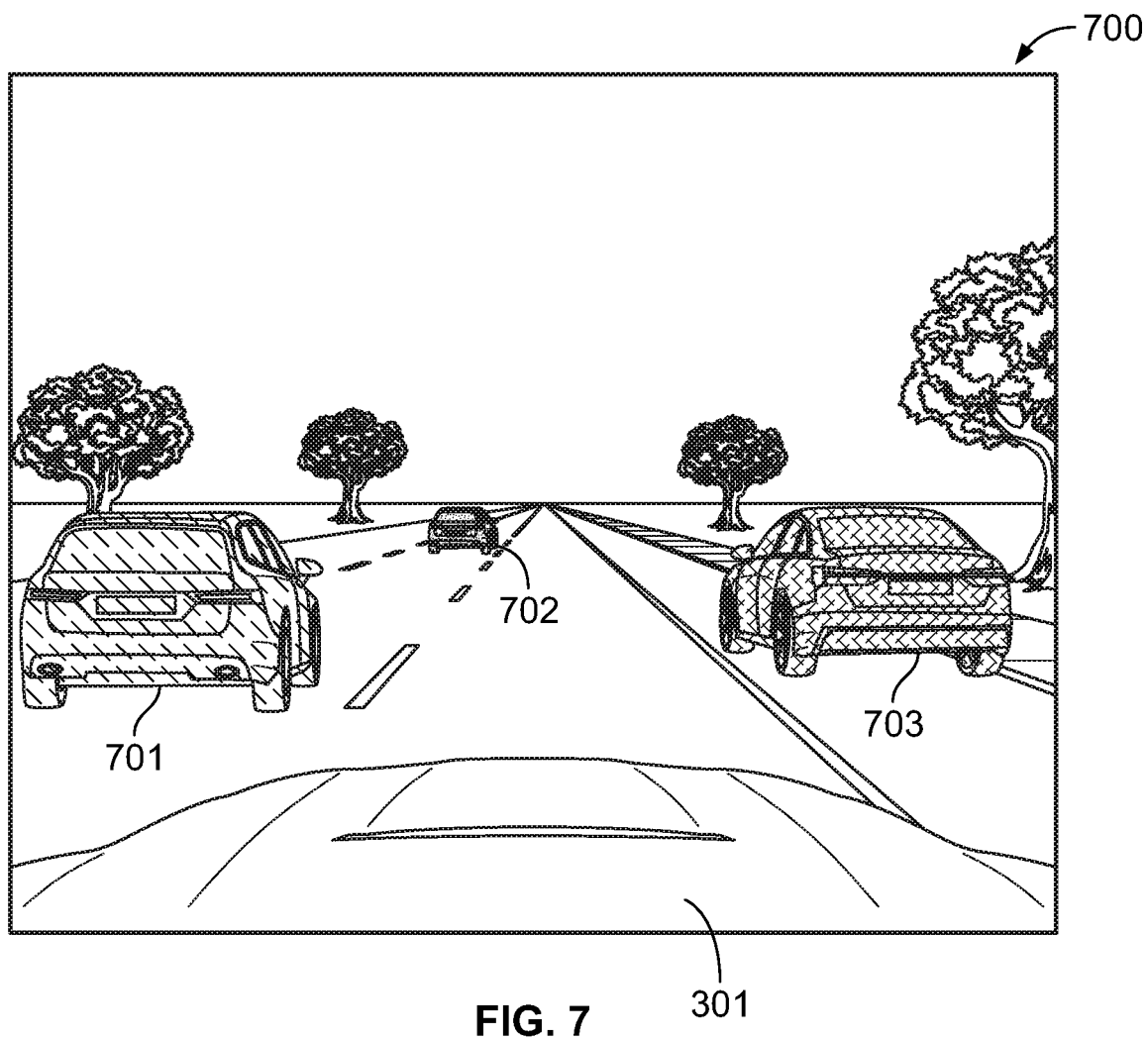
FIG. 7 depicts a simplified illustration of an example of instance segmentation.

To illustrate instance segmentation, FIG. 7 provides a simplified illustration of an example image 700 captured by collection vehicle 301. As shown, in this example, auto-labeling system 302 used instance segmentation to identify three unique instances of objects in a "vehicle" class, and then labeled these three unique instances of "vehicle" objects with respective 2D labels that take the form of unique 2D object masks 701, 702, and 703 (each of which may be associated with an indication of the "vehicle" class).

Auto-labeling system 302 may analyze 2D sensor data in order to identify and label unique instances of objects falling within classes of interest in other manners as well.

After auto-labeling system 302 identifies and labels unique instances of objects falling within classes of interest within each frame of 2D sensor data captured during the given window of time, auto-labeling system 302 has frame-by-frame sets of 2D labels for objects of interest. In practice, it is likely that at least some of those objects of interest will appear in a time sequence of frames. For example, if a parked vehicle was within the field of view of the camera array of collection vehicle 301 for some portion of the given window of time while collection vehicle 301 drove by the parked vehicle, then the 2D sensor data captured during the given window of time would include a sequence of frames that each include a respective capture of the parked vehicle. As such, auto-labeling system 302 may be able evaluate the frame-specific sets of 2D labels across the given window of time to determine whether 2D labels from different frames are representative of the same unique object and if so, associate the applicable 2D labels with one another.

In this respect, turning to block 404 of FIG. 4, auto-labeling system 302 may use the frame-by-frame sets of 2D labels generated at block 403 to generate a respective 2D track for each of one or more unique objects detected in the given real-world environment, where a respective 2D track for a given unique object comprises a set of one or more 2D labels that are representative of the given unique object across the given window of time. For instance, the respective 2D track for a given unique object may comprise all 2D labels generated at block 403 for the given unique object across the entire window of time (i.e., a time-sequence of 2D labels starting with a first 2D label corresponding to the earliest frame in which the unique object was detected and ending with a last 2D label corresponding to the final frame in which the unique object was detected). In this respect, the respective 2D track for a given unique object may provide a 2D representation of the given unique object's temporal evolution across the given window of time.

In practice, auto-labeling system 302 may generate 2D tracks in a variety of manners. As one possibility, auto-labeling system 302 may (i) evaluate the set of 2D labels for a first frame captured at a first capture time during the given window of time, which corresponds to an initial set of objects considered to be unique, and create an initial set of 2D tracks that includes a respective first 2D label for each object detected in the first frame, (ii) compare the set of 2D labels for a second frame captured at a first capture time during the given window of time to the set of 2D labels for the first frame and determine whether each 2D label from the second frame represents a temporal evolution of an object detected in the first frame or instead represents the first appearance of a new object, (iii) based on the comparison, (a) if a given 2D label from the second frame represents a temporal evolution of a given object detected in the first frame, add that given 2D label to the given object's 2D track, or (b) otherwise, create an initial 2D track for a newly-detected object that includes the given 2D label, and (iv) repeat this sequence of functions for each subsequent frame captured during the given window of time, which results in either adding each subsequent 2D label in each subsequent frame to an existing 2D track for a previously-detected unique object or creating a new 2D track for a newly-detected unique object. Auto-labeling system 302 may generate 2D tracks based on an analysis of 2D sensor data in other manners as well.

At block 405, auto-labeling system 302 may then use the 2D tracks generated at block 404 and the relationship between the 2D and the 3D sensor data to identify, within the time-aggregated 3D point cloud, a respective set of 3D data points associated with each of the one or more unique objects detected in the real-world environment across the given window of time. In this respect, each unique object's respective set of 3D data points may comprise one or more subsets of 3D data points that each correspond to a different capture of 3D sensor data (e.g., a different sweep of LIDAR data). Auto-labeling system 302 may perform this function in a variety of manners.

As one possibility, auto-labeling system 302 may identify 3D data points in the time-aggregated 3D point cloud that are associated with a given unique object's 2D track by performing the following functions for each respective 2D label in the given unique object's 2D track: (i) using the temporal relationship between the 2D and 3D sensor data (e.g., the capture times for 2D and 3D sensor data) to identify which capture(s) of 3D data points included in the time-aggregated, 3D point cloud correspond to a given capture time associated with the respective 2D label, and then (ii) using the spatial relationship between the 2D and 3D sensor data (e.g., the calibration between the 2D and 3D sensors) to identify a respective subset of 3D data points in the identified capture(s) of 3D data points that correspond to the 2D data points identified by the respective 2D label (e.g., the particular subset of 2D pixels encompassed by the 2D label). Other techniques for identifying the 3D data points in the 3D point cloud that are associated with a unique object's 2D track are also possible.

After identifying the respective subsets of 3D data points in the time-aggregated, 3D point cloud that are associated with a unique object's 2D track, auto-labeling system 302 may then assemble the respective subsets of 3D data points into a time-aggregated set of 3D data points that are associated with the given unique object across time. In turn, auto-labeling system 302 may demarcate the set of 3D data points identified as being associated with the given unique object across time in some manner. For instance, as one possibility, auto-labeling system 302 may fit a time-aggregated 3D convex hull and/or a time-aggregated 3D bounding box to the entire set of 3D data points identified as being associated with the given unique object across time, which serves to demarcate the set of 3D data points identified as being associated with the given unique object across time. As another possibility, auto-labeling system 302 may fit a respective 3D convex hull and/or a respective 3D bounding box to each capture-specific subset of 3D data points associated with the given unique object, which may result in a capture-specific set of 3D convex hulls and/or a 3D bounding boxes that collectively serve to demarcate the set of 3D data points identified as being associated with the given unique object across time. Auto-labeling system 302 may demarcate the set of 3D data points identified as being associated with a unique object across time in other manners as well. Further, it should be understood that auto-labeling system 302 may employ any of various techniques to fit a 3D convex hull and/or a 3D bounding box to a set of 3D data points, including but not limited to techniques based on machine learning or the like.

After identifying and demarcating the respective set of 3D data points associated with each of the one or more unique objects detected in the real-world environment across the given window of time, auto-labeling system 302 may also associate each unique object's demarcated set of 3D data points with an indication of the classification that was assigned to the unique object based on the 2D image data (perhaps along with other information about the unique object).

In some implementations, auto-labeling system 302 may also identify one or more "key frames" and generate a data structure that includes all 3D data points from the 3D point cloud that correspond to the "key frames." In general, a key frame is a set of sensor data from a given capture time (or range of capture times) that exhibits a threshold level of change relative to sensor data from previous capture times (or ranges of capture times). In practice, auto-labeling system 302 may identify and store data for "key frames" in a variety of manners.

As one possibility, auto-labeling system 302 may (i) evaluate a given capture of 2D sensor data (e.g., a given frame) from a given capture time relative to captures of 2D sensor data from previous capture times, (ii) based on that evaluation, determine that there is a threshold level of change (e.g., in terms of pixel locations) between the given capture of the 2D sensor data and the other captures of 2D sensor data, thereby identifying a "key frame," and (iii) based on that determination, identify and store the capture(s) of 3D data points having a capture time that is the same as, or approximately the same as, as the given capture time of the given capture of 2D sensor data.

As another possibility, auto-labeling system 302 may (i) evaluate a given capture of 3D data points from the 3D point cloud from a given range of capture times (or singular capture time) relative to captures of 3D point cloud data from previous ranges of capture times (or previous singular capture time), (ii) based on that evaluation, determine that there is a threshold level of change between the given capture of 3D data points and the other previous captures of 3D data points, thereby identifying a "key frame," and (iii) based on that determination, identify and store all 3D data points included in the given capture of 3D data points.

Auto-labeling system 302 may identify and store data for "key frames" in other manners as well.

At block 406, auto-labeling system 302 may generate a respective 3D track for each given unique object detected in the given real-world environment, where (i) a 3D track for a given unique object comprises a set of one or more 3D labels that are representative of the temporal evolution of the given unique object in the 3D space across the given window of time (e.g., one 3D label per capture of 3D data points in which the given unique object appears) and (ii) each respective 3D label included in the 3D track may take any of various forms, examples of which may include a 3D convex hull and/or a 3D bounding box that is associated with an indication of the classification assigned to the unique object. In this respect, the 3D track for a given unique object may serve as one way to represent the given object's trajectory within the given real-world environment during the given window of time.

In practice, auto-labeling system 302 may generate a 3D track for a given unique object in a variety of manners. As one possibility, auto-labeling system 302 may start with the set of 3D points from the time-aggregated, 3D point cloud that were identified as being associated with the given unique object at block 405, which could be demarcated by a time-aggregated 3D convex hull, a time-aggregated 3D bounding box, a set of capture-specific 3D convex hulls, and/or a set of capture-specific 3D bounding boxes, among other possibilities. Auto-labeling system 302 may then input the demarcated set of 3D points associated with the given unique object into a motion model (e.g., a filter-fusion motion model) that encodes the real-world motion behavior of an object of the same type as the given unique object (including any real-word constraints on the object's motion), which may in turn generate and output a time-sequence of 3D labels for the given unique object that may each take the form of 3D convex hull and/or 3D bounding box, among other possibilities. In practice, the time-sequence of 3D labels produced by such a motion model may provide a more uniform (or "smoothed") 3D representation of the given unique object's temporal evolution, which may lead to improved visualization and labeling of the given unique object in the 3D space. Lastly, after the time-sequence of 3D labels for the given unique object have been generated using a motion model (or the like), auto-labeling system 302 may assemble this time-sequence of 3D labels into the 3D track for the given unique object.

Auto-labeling system 302 may generate a 3D track for a unique object in other manners as well. For instance, instead of using a motion model to generate the time-sequence of 3D labels that make up the 3D track, it is possible that auto-labeling system 302 may build a 3D track for a given unique object directly from a capture-specific set of 3D convex hulls and/or 3D bounding boxes that are derived at block 405 in order to demarcate the set of 3D data points associated with the given unique object.

Once auto-labeling system 302 has generated a 3D track for a given unique object, auto-labeling system 302 may also derive a variety of other information about the given object based on the given object's 3D track. For example, based on a given unique object's 3D track, auto-labeling system 302 may determine a set of poses for the given object that are indicative of the given object's 3D position (e.g., x-, y-, and z-coordinates) and/or orientation (e.g., utilizing quaternions) at various time points throughout the given window of time. In this respect, the set of poses for the given unique object may serve as another way to represent the given unique object's trajectory within the given real-world environment during the given window of time.

As another example, based on a given unique object's 3D track, auto-labeling system 302 may determine whether the given object was moving at any point in time during the given window of time. This function is described in further detail below in connection with block 408.

As yet another example, to the extent that a given unique object is determined to be moving at any point in time during the given window of time, then based on the given object's 3D track, auto-labeling system 302 may determine a velocity of the given object at one or more times during the given window of time. For instance, after determining that a given unique object was moving at a particular time during the given window of time, auto-labeling system 302 may determine the given object's velocity at that particular time based at least on the given object's 3D track and perhaps also on data that is indicative of the operation of collection vehicle 301 at or around that particular time (e.g., localization data indicating the collection vehicle's trajectory and/or the capture rate of collection vehicle's 3D sensor).

As still another example, auto-labeling system 302 may evaluate each capture-specific subset of 3D data points associated with a given unique object to determine which capture of 3D data points provides the "best view" of the given unique object.

Likewise, auto-labeling system 302 may derive other types of information about a given unique object based on the given object's 3D track as well.

At block 407, auto-labeling system 302 may generate, for each given unique object detected in the given real-world environment, a respective data structure that provides a data representation of the given object. The particular set of data included in such a data structure for a given unique object may take various forms.

As one possibility, the generated data structure for a given unique object may include an identifier of the given object (e.g., a unique identifier to distinguish the given object from other objects that collection vehicle 301 encountered during its mission).

As another possibility, the generated data structure for a given unique object may include an indication of the classification that has been assigned to the given unique object (e.g., one of the object classes of interest discussed above). This indication may take various forms, examples of which may include a textual description of the assigned object class (e.g., "vehicle," "pedestrian," etc.), an alphanumeric code that signifies the assigned object class, and/or color code (or the like) that is associated with the assigned object class, among other possible forms. In line with the discussion above, it should be understood that this indication of the classification assigned to the given unique object may be determined based on the 2D image data, and may comprise one aspect of the given unique object's 3D labels, although it may be maintained in the generated data structure separately from the other aspects of the given unique object's 3D labels (e.g., the 3D bounding boxes and/or 3D convex hulls).

As yet another possibility, the generated data structure for a given unique object may include data that is indicative of a 3D trajectory of the given object across the given window of time. Such data may take various forms, examples of which may comprise the 3D track for the given unique object that was generated at block 406, a derived set of poses for the given unique object across the given window of time, and/or a derived set of velocities for the given unique object across the given window of time, among other possibilities.

As still another possibility, the generated data structure for a given unique object may include data indicating whether the given unique object was in motion at any point in time during the window of time. Such data may take various forms, examples of which may comprise data defining the start and end times of each segment of the given window of time during which the given unique object was in motion and/or data defining the start and end times of each segment of the given window of time during which the given unique object was not in motion, among other possibilities.

As a further possibility, the generated data structure for a given unique object may include a demarcation of at least some of the data points within the 3D point cloud that were identified as being associated with the given object at block 405. For instance, the generated data structure may include a demarcation of the entire set of the 3D data points that were identified as being associated with the given unique object across time, which may include each capture-specific subset of 3D data points associated with the given unique object. In this respect, the demarcation of the entire set of the 3D data points that were identified as being associated with the given unique object across time may take the form of a time-aggregated convex hull, among other possibilities. Alternatively, the generated data structure may include a demarcation of only certain ones of the capture-specific subsets of 3D data points associated with the given unique object, such as a demarcation of the capture-specific subsets of 3D data points associated with the given unique object that correspond to "key frames." In this respect, the demarcation of such capture-specific subsets of 3D data points associated with the given unique object may take the form of a capture-specific set of 3D convex hulls, among other possibilities. The demarcation of 3D data points included within the generated data structure for a given unique object may take other forms as well.

As still another possibility, the generated data structure for a given unique object may include an identifier of the particular capture of 3D data points within the 3D point cloud that provides the "best view" of the given unique object (e.g., the capture that includes the greatest number of 3D data points associated with the given unique object). This identifier may take various forms, one example of which may comprise a capture time (or range of capture times) associated with the capture of 3D data points that provides the "best view" of the given unique object.

The generated data structure for a given unique object may include other data that defines some aspect of the given unique object as well.

In practice, each given unique object detected in the given real-world environment for which auto-labeling system 302 generated data structures at block 407 may have been stationary during the given window of time or may have been in motion during at least some portion of the given window of time. When a given unique object in the collection vehicle's surrounding environment was in motion, this generally makes the task of labeling and ultimately presenting the given object in a time-aggregated, 3D visualization more complex. For instance, for such an object, the captured 3D data points associated with the object may provide multiple different partial views of the object that are spread across multiple different positions within the surrounding environment, which makes it more difficult to effectively present such 3D data points in a time-aggregated manner. Further, combined with the fact that collection vehicle 301 itself was typically in motion during its missions, a given unique object in the collection vehicle's surrounding environment that was in motion makes it more difficult to determine what the object's position was vis-à-vis collection vehicle 301 (and thus the perspective at which collection vehicle 301 was perceiving the object) from capture-to-capture, which further increases the complexity of labeling and ultimately presenting the 3D data points associated with the object in a time-aggregated manner. Auto-labeling system 302 may be configured to perform certain functions to help address some of the complexities presented by objects that were in motion during the collection vehicle's missions, which may involve the sequence of functions shown in FIG. 4B at blocks 408-410.

For instance, at block 408, auto-labeling system 302 may evaluate whether each given unique object detected in the given real-world environment during the given window of time was in motion during at least a portion of the given window of time. While FIG. 4 shows this evaluation taking place after the 3D tracks and data structures have been generated for the unique objects detected in the given real-world environment, it should be understood that this sequence of functions is merely provided for purposes of illustration and that these functions may be performed in various other sequences as well. For instance, in some example embodiments, auto-labeling system 302 may perform this evaluation either prior to or in parallel with the generation of the 3D tracks and/or data structures for the unique objects detected in the given real-world environment, among other possibilities. In any event, auto-labeling system 302 may identify any moving objects within the unique objects detected in the given real-world environment in a variety of manners.

As one possibility, auto-labeling system 302 may perform this function by evaluating a given unique object's trajectory during the given window of time using a 3D track and/or a derived set of poses for the given object (e.g., as generated at block 406), which may provide an indication of whether the given object was in motion during at least a portion of the given window of time. For example, if the 3D label assigned to the given unique object (as reflected by its 3D track) and/or the position of the given object (as reflected by its set of poses) changes by some threshold amount over the course of the given window of time, this may serve as an indication that the given object was in motion during at least a portion of the given window of time. Auto-labeling system 302 may evaluate whether a given unique object was in motion during a portion of the given window of time in other manners as well.

Based on this evaluation, auto-labeling system 302 may identify at least one unique object detected in the given real-world environment that was in motion during at least a portion of the given window of time, which may be referred to herein as a "moving object."

At block 409, auto-labeling system 302 may then generate, for each respective moving object identified at block 408 (or at least a subset of the identified moving objects), a single, assembled 3D representation of the respective moving object—which may generally involve reconstructing the different subsets of 3D data points associated with the respective moving object across the given window of time (each of which corresponds to a different capture) into the single, assembled 3D representation. This reconstruction function may take various forms.

As one possibility, auto-labeling system 302 may reconstruct the different subsets of 3D data points associated with a given moving object into a single, assembled 3D representation of the moving object based on a trajectory of the moving object during the given window of time (e.g., as reflected by the 3D track and/or set of poses for the moving object) and perhaps also a trajectory of collection vehicle 301 during the given window of time (e.g., as reflected by localization data for the collection vehicle). For instance, based on the trajectory of the given moving object during the given window of time (and perhaps also the trajectory of collection vehicle 301), auto-labeling system 302 may align (or "stitch together") the different subsets of 3D data points associated with the moving object in a spatially logical manner that is independent of capture time. In this respect, auto-labeling system 302 may employ any of various techniques for reconstructing a 3D representation of an object from multiple partial views, including techniques that leverage the overlap between partial 3D views of an object as a way to align the different subsets of 3D points associated with a moving object and/or techniques that evaluate how the different partial 3D views map to the 3D shape of the moving object.

Figure 8A:
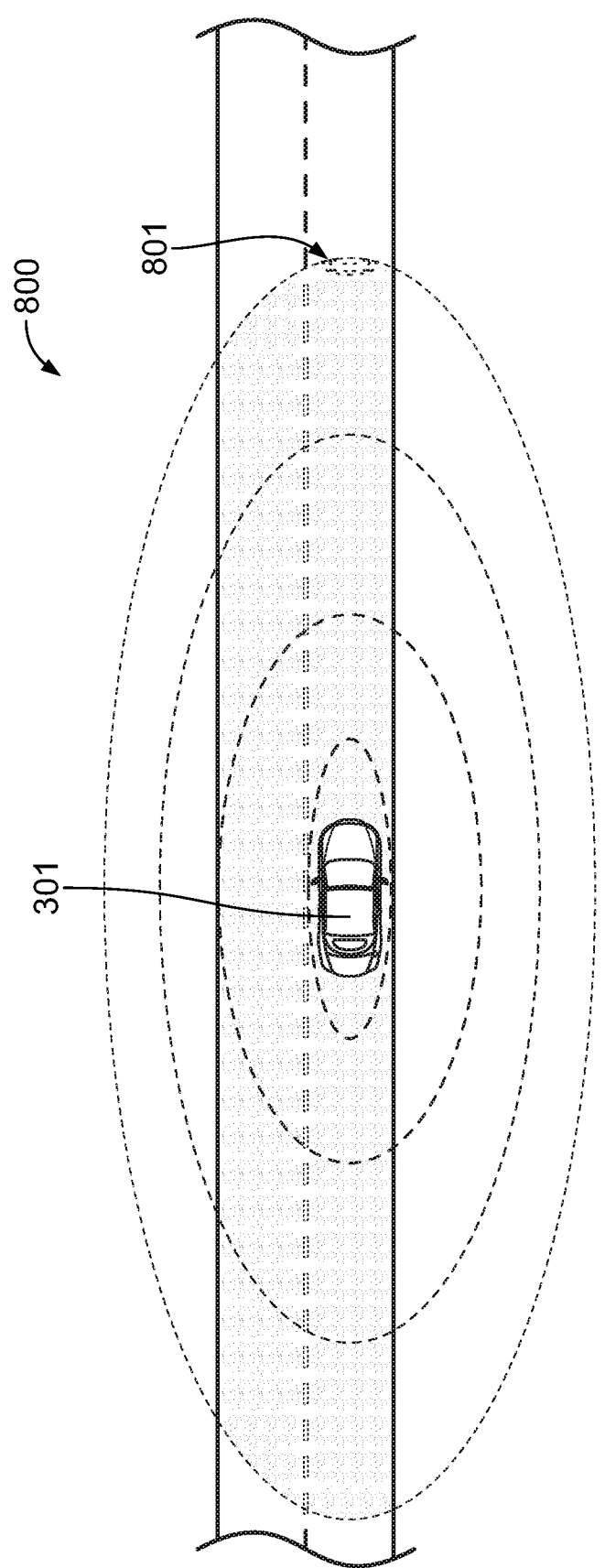
FIG. 8A depicts an example visualization of 3D data points from a first LIDAR sweep that correspond to a moving vehicle.
Figure 8B:
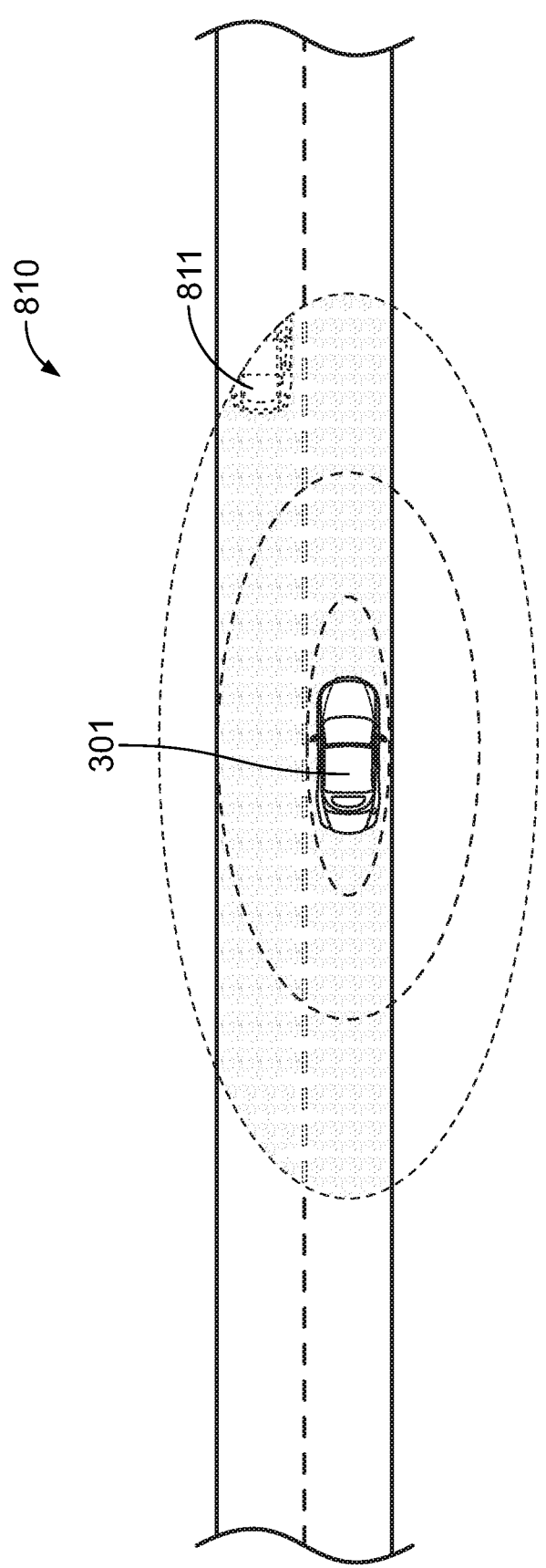
FIG. 8B depicts an example visualization of 3D data points from a second LIDAR sweep that correspond to a moving vehicle.
Figure 8C:
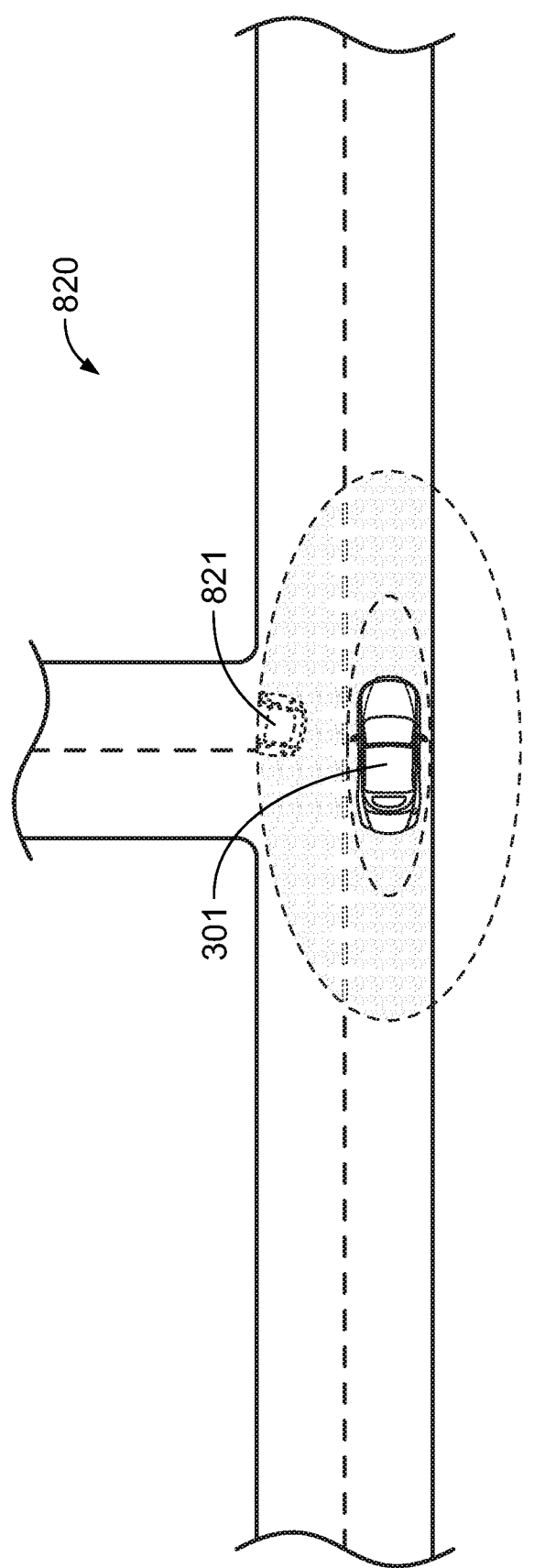
FIG. 8C depicts an example visualization of 3D data points from a third LIDAR sweep that correspond to a moving vehicle.

To illustrate, FIGS. 8A-D provide a simplified example of reconstructing different subsets of 3D data points associated with a given moving object into a single, assembled 3D representation of the given unique object. In particular, FIGS. 8A-8C illustrate respective captures of 3D sensor data from three different LIDAR sweeps that focus only on 3D data points for a second vehicle that was in motion during the collection vehicle's mission.

FIG. 8A provides a first conceptual illustration 800 of collection vehicle 301 capturing 3D sensor data representing the second vehicle in a first sweep. At the time of this first sweep, collection vehicle 301 was driving in the same lane as the second vehicle but was far behind the second vehicle (e.g., over 50 meters behind), so the first captured sweep of 3D sensor data only includes a sparse set of 3D data points 801 corresponding to the tail-end of the second vehicle.

FIG. 8B provides a second conceptual illustration 810 of collection vehicle 301 capturing 3D sensor data representing the second vehicle in a second sweep. At the time of this second sweep, collection vehicle 301 had closed the spatial gap between it and the second vehicle (e.g., was less than 50 meters behind) and was off to the right side of the second vehicle (e.g., the second vehicle pulled into a left lane), so the second captured sweep of 3D data includes a relatively moderate set of 3D data points 811 corresponding to the tail-end and rear portion of the passenger side of the second vehicle.

FIG. 8C provides a third conceptual illustration 820 of collection vehicle 301 capturing 3D sensor data representing the second vehicle in a third sweep. At the time of this third sweep, collection vehicle 301 was passing the second vehicle as the second vehicle was making a left turn, so the third captured sweep of 3D data includes a relatively dense set of 3D data points 821 corresponding to the tail-end and rear portion of the driver-side of the second vehicle.

Figure 8D:
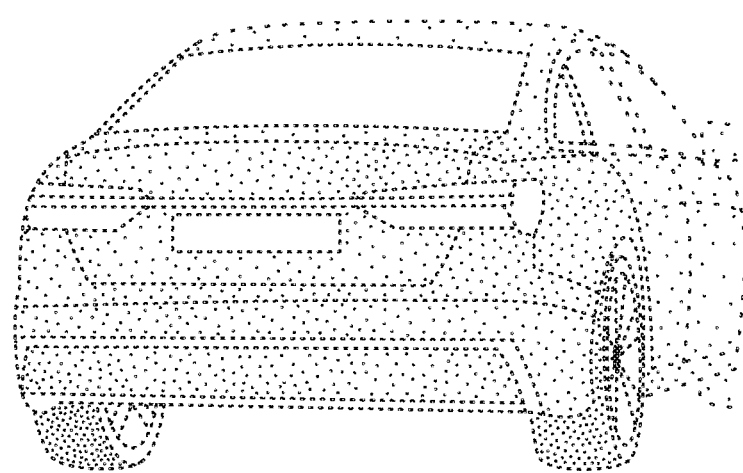
FIG. 8D depicts a simplified illustration of a single, assembled 3D representation of the moving vehicle from FIGS. 8A-8C.

Based at least on a trajectory of the second vehicle during the given window of time (e.g., as reflected by the 3D track and/or set of poses for the second vehicle), auto-labeling system 302 is able to reconstruct sets of 3D data points 801, 811, and 821 into a single, assembled 3D representation of the second vehicle, as shown in FIG. 8D, which may then make it easier for a curator to perform labeling actions with respect to the vehicle.

Auto-labeling system 302 may generate a single, assembled 3D representation of a moving object in other manners as well—including the possibility that auto-labeling system 302 may incorporate a 3D shape model for the moving object into the 3D point cloud (e.g., in place of the 3D data points associated with a moving object).

Further, after auto-labeling system 302 generates a single, assembled 3D representation of a given moving object, auto-labeling system 302 may take various actions with respect to that single, assembled 3D representation of the moving object. As one possibility, auto-labeling system 302 may store data that is indicative of the single, assembled 3D representation of the given moving object as part of the data structure for the moving object that is described above in connection with block 407. As another possibility, auto-labeling system 302 may prepare to incorporate the single, assembled 3D representation of the given moving object into a time-aggregated, 3D visualization of the given real-world environment during the given window of time, which is described in further detail below. Auto-labeling system 302 may take other actions with respect to a single, assembled 3D representation of a given moving object as well.

In line with the discussion above, it should be understood that when collection vehicle 301 perceives a given unique object that is moving during a mission, the respective captures of 3D sensor data by collection vehicle 301 may only provide partial representations of that moving object that are spread out over different positions within the real-world environment (e.g., as illustrated in FIGS. 8A-8C). For example, assuming a given moving object was another vehicle, a first capture of 3D sensor data may only provide a representation of the other vehicle's tail-end at a first position in the real-world environment, a second capture of 3D sensor data may only provide a representation of the other vehicle's passenger side at a second position in the real-world environment, and a third capture of 3D sensor data may only provide a representation of the other vehicle's frontend at a third position in the real-world environment. As a result of these partial representations of the other vehicle, the 3D labels included in a 3D track generated by auto-labeling system 302 at block 406 may take the form of "partial" 3D labels, in the sense that each such 3D label may be representative of only a certain portion of the other vehicle perceived by collection vehicle 301 during a given capture. As one example, a set of "partial" 3D labels may take the form of a set of 3D bounding boxes and/or 3D convex hulls, each of which circumscribes only a portion of the other vehicle. However, in practice, it may be desirable to have 3D labels for a moving object that circumscribe the entirety of the moving object as opposed to only a portion of the moving object.

As such, at block 410, auto-labeling system 302 may also function to generate, for each respective moving object identified at block 408 (or at least a subset of the identified moving objects), a set of "assembled" 3D labels that are each representative of a full 3D footprint of the respective moving object perceived by collection vehicle 301 at various time points across the given window of time (e.g., one assembled 3D label per capture of 3D data points in which the moving object appears). In this respect, the set of assembled 3D labels for the respective moving object may serve to replace or supplement the partial 3D labels that may otherwise be generated for the respective moving object (e.g., the set of assembled 3D labels could be used in place of partial 3D labels when defining a 3D track for a moving object). As with the 3D labels described above, the set of assembled 3D labels for a given moving object may take any of a variety of forms, examples of which may include 3D bounding boxes and/or 3D convex hulls.

Auto-labeling system 302 may generate the set of assembled 3D labels for a moving object in a variety of manners. As one possibility, auto-labeling system 302 may generate the set of assembled 3D labels for a moving object by (i) fitting a first 3D label (e.g., a 3D bounding box and/or a 3D convex hull) to the single, assembled representation of the moving object at a first point along the moving object's trajectory and then (ii) interpolating the first 3D label to each of various other points along the moving object's trajectory using a motion model or the like. Auto-labeling system 302 may generate the set of assembled 3D labels for a moving object in other manners as well.

Further, after auto-labeling system 302 generates a set of assembled 3D labels for a given moving object, auto-labeling system 302 may take various actions with respect to the set of assembled 3D labels. As one possibility, auto-labeling system 302 may store data that is indicative of the set of assembled 3D labels for the given moving object as part of the data structure for the moving object that is described above in connection with block 407 (e.g., as part of the data defining the 3D track for the moving object). As another possibility, auto-labeling system 302 may prepare to incorporate one or more of the assembled 3D labels for the given moving object into a time-aggregated, 3D visualization of the given real-world environment during the given window of time, which is described in further detail below. Auto-labeling system 302 may take other actions with respect to the set of assembled 3D labels for a given moving object as well.

Turning next to block 411, auto-labeling system 302 may generate a time-aggregated, 3D visualization of the real-world environment in which collection vehicle 301 was operating during the given window of time, which may be presented to a curator. In practice, a time-aggregated, 3D visualization of the real-world environment in which collection vehicle 301 was operating during the given window of time may take various forms.

As one possibility, the time-aggregated, 3D visualization of the real-world environment may include a respective 3D visualization for each of one or more unique objects detected in the real-world environment. For example, a 3D visualization for a given unique object detected in the real-world environment may take the form of a visualization of the time-aggregated set of 3D data points that were identified at block 405 as being associated with that given unique object—which may provide a higher-fidelity representation of the given unique object than a visualization based on a single capture of 3D data points (particularly for stationary objects). As another example, if a given unique object was identified to be a moving object at block 408, a 3D visualization for that given unique object may take the form of a visualization of a single, assembled 3D representation of the given moving object that auto-labeling system 302 reconstructed based on the respective set of 3D data points identified at block 405 as being associated with that given moving object. In such instances, the visualization of the single, assembled 3D representation of the given moving object could be presented in the time-aggregated, 3D visualization of the real-world environment either at a single point along the trajectory of the moving object (e.g., the first, last, or middle point along the trajectory) or at multiple different points along the trajectory of the moving object to give the appearance that the moving object was in motion (e.g., at the points along the moving object's trajectory that correspond to the identified key frames).

As another possibility, the time-aggregated, 3D visualization of the real-world environment may further include a respective visualization of at least one respective 3D label for each of the one or more unique objects detected in the real-world environment, which may comprise a 3D bounding box and/or a 3D convex hull along with a visual indication of a classification assigned to the object. In practice, the at least one respective 3D label presented for a given unique object may be a given one of the 3D labels for the unique object generated at block 406 based on 3D data points associated with the unique object, or in cases where the given unique object was identified to be a moving object at block 408, the at least one respective 3D label for the given moving object may be a given one of the assembled 3D labels generated at block 410 based on the single, assembled 3D representation of the given moving object, among other possibilities.

Auto-labeling system 302 may also generate the time-aggregated, 3D visualization in a manner that provides a curator with various selectable options to help facilitate the curator's labeling task. For instance, as one possibility, the time-aggregated, 3D visualization may be generated to include selectable options for showing or hiding different categories of objects detected in the given real-world environment (e.g., via respective on/off toggles or the like). In this respect, the different categories of objects may comprise (i) static objects (e.g., buildings, fire hydrants, telephone poles, etc.), (ii) dynamic objects that were not in motion during the given window of time (e.g., parked vehicles, locked bicycles, etc.), and (iii) dynamic objects that were in motion during the given window of time (e.g., pedestrians, moving vehicles, etc.), among various other possibilities of categorizations.

As another possibility, the time-aggregated, 3D visualization may be generated to include selectable options that enable a curator to select a given unique object detected in the given real-world environment and responsively, access additional information about the given object, such as an indication of the given object's trajectory during the given window of time (perhaps along with one or more 3D labels for the object along that trajectory), an indication of the classification of the given object (which may be presented as part of the 3D label for the given object by using a particular color or descriptor to indicate the assigned classification), and/or 2D image data related to the given object, among other possible types of additional information about the given object that may be presented to a curator. As one particular example, auto-labeling system 302 may generate the time-aggregated, 3D visualization in a manner that allows a curator to view a temporal progression of a single, assembled 3D representation of a given object that was in motion during the given window of time (e.g., by showing the single, assembled 3D representation of the given object moving within the time-aggregated, 3D visualization along the moving object's trajectory in a video-like manner).

As yet another possibility, the time-aggregated, 3D visualization may be generated to include selectable options that enable a curator to zoom in and/or zoom out on the time-aggregated, 3D visualization such that more or less detail may be presented.

The time-aggregated, 3D visualization may be generated to include other kinds of selectable options as well. Further, auto-labeling system 302 may use various data processing techniques to enable the time-aggregated, 3D visualization to include these kinds of selectable options, including but not limited to tiling and/or sampling.

After generating the time-aggregated, 3D visualization of the real-world environment as perceived by collection vehicle 301 during the given window of time, auto-labeling system 302 may then cause the time-aggregated, 3D visualization to be presented to a curator. This function may also take various forms. As one possibility, auto-labeling system 302 may communicate with curator client station 303 that is communicatively coupled with auto-labeling system 302 via one or more data networks 304 in a manner that causes the client station to present the time-aggregated, 3D visualization to a curator. As another possibility, auto-labeling system 302 may comprise a user interface that includes a display component, in which case auto-labeling system 302 causes the display component to present the time-aggregated, 3D visualization to a curator. Auto-labeling system 302 may cause the time-aggregated, 3D visualization to be presented to a curator in other manners as well.

As discussed before, FIGS. 2A-B and 2C-D provide simplified examples of time-aggregated, 3D visualizations that may be presented at curator client station 303 utilizing the technological innovations disclosed herein. In particular, FIGS. 2A-B illustrate (i) a time-aggregated, 3D visualization 200 that provides a high-fidelity depiction of a real-world environment encountered by a collection vehicle during a window of time of a given mission performed by the collection vehicle and (ii) control panel 201 that allows the curator to interact with time-aggregated, 3D visualization 200. For instance, as shown, the curator has selected, via control panel 201, a particular object of interest and a visualization of a 3D label corresponding to that object of interest is presented within time-aggregated, 3D visualization 200 in the form of 3D bounding box 202. In this example, auto-labeling system 302 may not have performed the functions of blocks 408-410 of flow diagram 400 related to moving objects, and therefore, the set of 3D data point 203 (which are associated with an object of interest that was in motion during some portion of the collection vehicle's mission) are presented in a "smeared" manner.

On the other hand, auto-labeling system 302 did perform the functions of blocks 408-410 of flow diagram 400 when generating time-aggregated, 3D visualization 210 of FIGS. 2C-D. Consequently, time-aggregated, 3D visualization 210 includes (i) a similar high-resolution depiction of the collection vehicle's environment during the window of time as shown in FIGS. 2A-B except that the set of 3D data points 203 associated with the moving object of interest is no longer visualized in its original, smeared form. Instead, a single, assembled 3D representation of the moving object of interest 211 is shown at one point along the moving object's trajectory during the window of time. Moreover, as shown, the curator has selected, via control panel 212, the moving object of interest and a visualization of an assembled 3D label corresponding to the moving object's single, assembled 3D representation is presented within time-aggregated, 3D visualization 210 in the form of 3D bounding box 213.

As illustrated in FIGS. 2A-B and 2C-D, in contrast to traditional 3D-point-cloud visualizations that provide sparse, lower-fidelity depictions of real-world environments, auto-labeling system 302 advantageously generates time-aggregated, 3D visualizations of real-world environments in which collection vehicles performed missions that provide high-fidelity representations of these real-world environments in a 3D-point-cloud format. Such high-fidelity representations may then be used for various purposes, such as for labeling 3D sensor data that may ultimately be used to train highly-accurate object-detection model and/or build highly-accurate HD maps, among other possibilities.

In this respect, at block 412, auto-labeling system 302 may receive annotation data indicative of a labeling action for a given object presented within the time-aggregated, 3D visualization. Example labeling actions may include (i) resizing a 3D label, (ii) rotating a 3D label, (iii) translating (e.g., shifting) a 3D label, (iv) deleting a 3D label, (v) creating a new 3D label, or (iv) modifying a classification associated with the 3D label, among other possible labeling actions.

As one illustrative example, returning to FIGS. 2A-B, a curator may be presented with a 3D label for the first vehicle parked to the right of the road that comprises 3D bounding box 202, which may be may be defined in terms of an x-, y-, and z-coordinate that indicates a centerpoint of 3D bounding box 202, a set of width, length, and depth values for 3D bounding box 202, and a set of yaw, pitch, and roll values for 3D bounding box 202. The curator may then be able to modify one or more of these values by either clicking and dragging the visualization of 3D bounding box 202 or interacting with 3D label fields 204 of control panel 201, which may in turn cause curator client station 303 to send annotation data indicative of the modifications to 3D bounding box 202 to auto-labeling system 302. (Although not shown in FIGS. 2A-B, it should be understood that time-aggregated, 3D visualization 200 may enable the curator to view and potentially modify the classification assigned to the given object as well. Further, although not shown, it should be understood that 2D image data related to an object shown in the time-aggregated, 3D visualization may be selectively presented to a curator to assist in the task of performing a labeling action with respect to that object).

At block 413, auto-labeling system 302 may then apply the labeling action to a given data structure that corresponds to the given object. In practice, auto-labeling system 302 may perform this function in a variety of manners, which may depend on the type of the particular labeling action.

As one possibility, in response to receiving an indication of a modification to a classification assigned to a given object, auto-labeling system 302 may update the data structure for the given object to reflect the modified classification (which may apply to each 3D label in the given object's 3D track), and may also function to update the time-aggregated visualization of the real-world environment to indicate that the classification assigned to the given object has been changed (e.g., by displaying a 3D bounding box for the given object in a different color that is associated with the new classification).

As another possibility, in response to receiving an indication of a modification to one or more values that define a 3D label being presented for a given object, such as the x-coordinate, y-coordinate, z-coordinate, width, length, depth, yaw, pitch, and/or roll of the 3D label, auto-labeling system 302 may update the data structure for the given object to reflect this modification. In this respect, auto-labeling system 302 may function to (i) change the values that define the one particular 3D label presented in the time-aggregated, 3D visualization to reflect the new values input by the curator and also (ii) propagate such changes to the other 3D labels included in the given object's 3D track, which may involve the use of a motion model for the given object (particularly if the given object was in motion during at least a portion of the scene). Further, in instances where the 3D label being modified is an assembled 3D label that corresponds to a set of partial 3D labels for a moving object, auto-labeling system 302 may additionally function to translate and propagate the changes from the assembled 3D label to that set of partial 3D labels, which may also involve the use of a motion model for the moving object.

Auto-labeling system 302 may apply a labeling action to a given data structure that corresponds to a given object in other manners as well.

In this way, a curator's requested change to a single 3D label for a given object within the time-aggregated, 3D visualization of the real-world environment is propagated through to each capture-specific 3D label for that given object across the given window of time, thereby significantly reducing the human-labor and time required to label 3D point clouds.

In some example implementations, auto-labeling system 302 may be further configured generate a time-aggregated, 3D visualization in a manner that allows a curator to provide a 3D label for a particular object within the time-aggregated, 3D visualization that was not initially labeled by auto-labeling system 302. For example, auto-labeling system 302 may have identified a respective set of one or more data points from the 3D point cloud that are associated with the particular object across the given window of time at block 405 and generated a 3D object data structure for the particular object at block 407, but it may not have generated a 3D track for the particular object that includes a set of one or more 3D labels. In these circumstances, auto-labeling system 302 may be configured to generate a 3D track for the particular object that includes a set of one or more 3D labels based at least in part on receiving annotation data indicative of a request to apply a 3D label to the particular object from curator client station 303. In practice, auto-labeling system 302 may perform this function in a variety of manners.

As one possibility, after generating a time-aggregated, 3D visualization at block 411, auto-labeling system 302 may receive, from curator client station 303, annotation data indicative of a labeling action for a particular object within the time-aggregated, 3D visualization that was not previously labeled. For example, assuming the particular object was in motion during the given window of time depicted in the time-aggregated, 3D visualization, auto-labeling system 302 may receive a request to apply a 3D label to the single, assembled 3D representation of the particular object that is presented at one point along the trajectory of the particular object within the time-aggregated 3D visualization.

Thereafter, auto-labeling system 302 may generate, based on the received annotation data and the set of 3D data points that are associated with the particular object, a 3D track for the particular object that includes a set of 3D labels, each of which is representative of the particular object at a different time point along the given window of time. Returning to the last example, auto-labeling system 302 may generate, based on the request to apply a 3D label to a particular object that was in motion, the set of 3D data points that are associated with that particular object, and perhaps also a motion model, a 3D track for the particular object that includes a set of partial 3D labels, each of which is representative of at least a portion of the particular object from a different capture during the given window of time. In any case, data indicative of the generated 3D track for the particular object may then be stored in the data structure for the particular object.

Auto-labeling system 302 may apply a 3D label to a previously unlabeled object within a time-aggregated, 3D visualization in other manners as well. Likewise, auto-labeling system 302 may perform other functions related to processing and labeling sensor data captured by collection vehicles.

In addition to generating and presenting a curator with a time-aggregated, 3D visualization of the given real-world environment perceived by collection vehicle 301 during a mission, it should be understood that auto-labeling system 302 may be capable of generating and presenting a curator with a visualization of individual captures of 2D and/or 3D sensor data as well. For instance, while presenting a curator with a time-aggregated, 3D visualization of the given real-world environment, auto-labeling system 302 may receive data from the curator's client station indicating that the curator wishes to view one individual capture of 2D and/or 3D sensor data, such as the capture of 3D sensor data that provides the "best view" of a given object or the 2D image data related thereto. In response, auto-labeling system 302 may then generate a present a visualization of that one individual capture of 2D and/or 3D sensor data.

Figure 9:
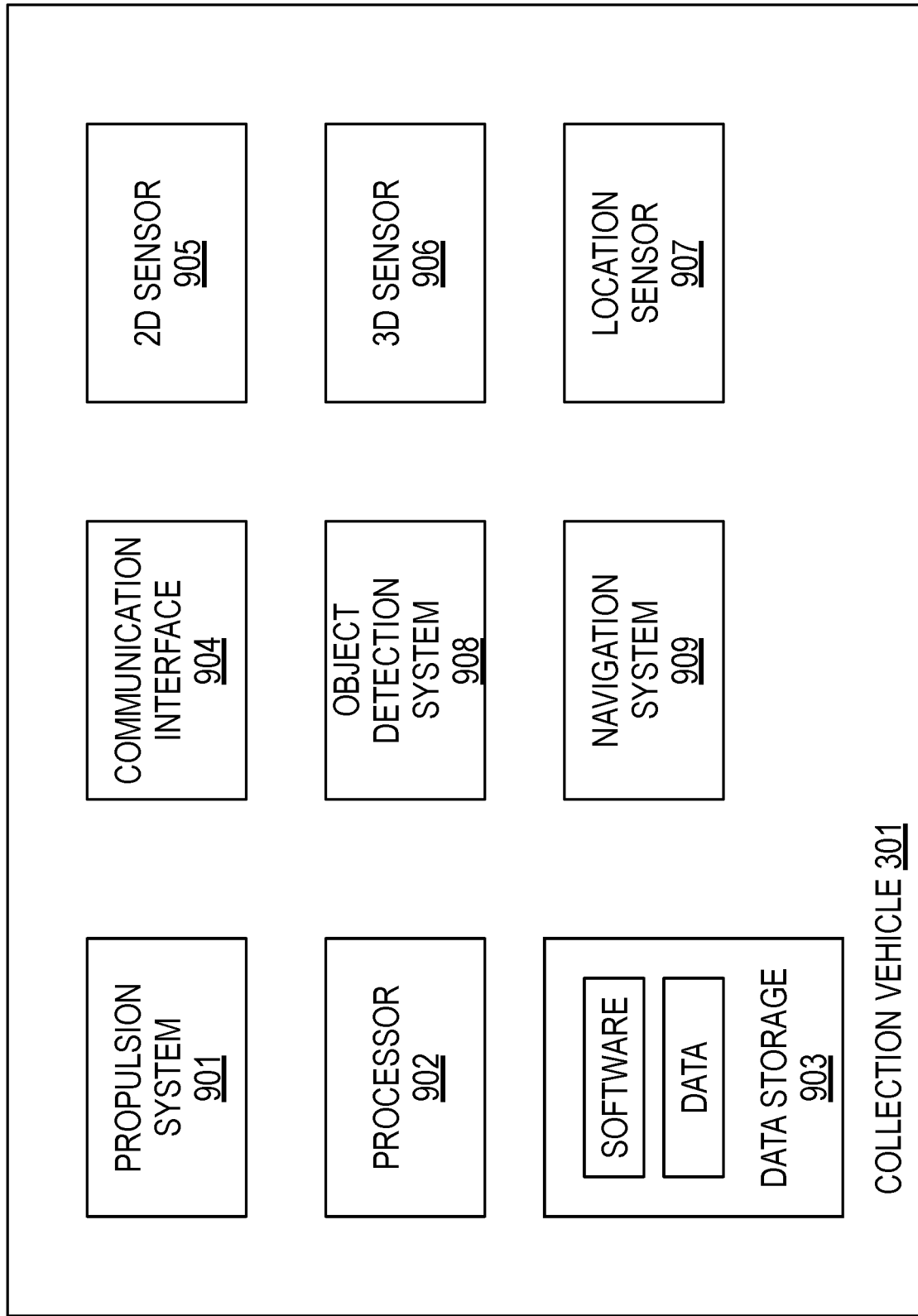
FIG. 9 depicts a simplified block diagram of an example collection vehicle.

Turning now to FIG. 9, a simplified block diagram of certain structural details of collection vehicle 301 of FIG. 3 is illustrated. As noted above, collection vehicle 301 may take the form of a vehicle that is designed to operate autonomously at some or all times (e.g., a semi- or fully-autonomous vehicle) or a vehicle that is designed to be driven manually by a human at all times. In scenarios where collection vehicle 301 takes the form of a vehicle that is not designed to operate autonomously, certain of the systems and/or components discussed below may not be present.

As shown, collection vehicle 301 includes a propulsion system 901 that generally comprises a chassis and a set of wheels coupled to a drivetrain that links the set of wheels to an engine (e.g., an internal combustion or electric engine), which produces power that causes the set of wheels to rotate, thereby allowing collection vehicle 301 to drive (e.g., fully- or semi-autonomously or manually) through real-world environments. Collection vehicle 301 includes a variety of additional systems and components that generally facilitate this functionality, combinations of which are mechanically and/or communicatively linked.

For instance, collection vehicle 301 includes at least one processor 902 that is configured to execute software stored on data storage 903, thereby providing collection vehicle 301 with the capability of performing various traditional vehicle functions, various autonomous functions, and/or various other functions disclosed herein. Processor 902 may comprise one or more processor components that may include one or more of (i) a general-purpose processor (e.g., a microprocessor), (ii) a special-purpose processor (e.g., an application-specific integrated circuit, a digital signal processor, a graphics processing unit, a vision processing unit, etc.), (iii) a programmable logic device (e.g., a field-programmable gate array), or (iv) a controller (e.g., a microcontroller), among other possibilities. Data storage 903 may comprise one or more non-transitory computer-readable mediums that may include one or more of (i) a volatile medium (e.g., random-access memory, a register, a cache, a buffer, etc.) or a non-volatile medium (e.g., read-only memory, a hard-disk drive, a solid-state drive, flash memory, an optical disk, etc.). In turn, data storage 903 may be provisioned with software that may take the form of program instructions that are executable by processor 902 such that collection vehicle 301 is configured to perform various traditional vehicle functions, various autonomous functions, and/or various other functions disclosed herein. Data storage 903 may further store a variety of data in one or more databases, file systems, or other information depositories. Such data may include sensor data captured or otherwise sensed by collection vehicle 301, geometric maps, semantic maps, navigation data, traffic data, 3D models, object-detection models, etc.

Collection vehicle 301 also includes at least one communication interface 904 that is configured to facilitate communication between collection vehicle 301 and other entities, such as other vehicles, auto-labeling system 302, and/or a ride-share dispatch system, among other possibilities. Communication interface 904 may include one or more of (i) a wired communication interface (e.g., an Ethernet interface, a serial bus interface such as Firewire or USB, etc.) or (ii) a wireless communication interface (e.g., a chipset-antenna pair configured for wireless communication, a wireless NIC, a WiFi adapter, a cellular network adapter, etc.). In practice, communication interface 904 may include multiple interfaces of different types. For example, collection vehicle 301 may include (i) a wired interface configured to (a) transfer sensor data to auto-labeling system 302 and (b) receive map data, object-detection models, etc. from auto-labeling system 302, (ii) a first wireless interface configured for vehicle-to-vehicle communications (e.g., a short-range wireless interface), and (iii) a second wireless interface configured to communicatively couple collection vehicle 301 to a cloud system, such as a ride-share dispatch system or auto-labeling system 302 (e.g., a WAN wireless interface), among other possibilities.

Collection vehicle 301 further includes a variety of sensors that capture data representing the collection vehicle's surroundings and that facilitate autonomous operations, such as at least one 2D sensor 905, at least one 3D sensor 906, and at least one location sensor 907, each of which is generally configured to detect one or more particular stimuli from the collection vehicle's real-world environment and then output data indicative of one or more measured values of the one or more stimuli at a given capture time or range of capture times. In practice, each sensor may have a respective capture or sampling rate that may differ from other sensor's rates.

Two-dimensional sensor 905 may include one or more 2D sensors that are configured to capture 2D data (e.g., 2D images) representative of the collection vehicle's surroundings. Examples of 2D sensors may include 2D cameras, 2D radars, 2D sonars, 2D ultrasound sensors, and 2D scanners, among other possibilities. Two-dimensional sensor 905 may be equipped with visible-light and/or infrared sensing capabilities, among other possibilities. In example implementations, 2D sensor 905 may include a set of 2D sensors arranged in a manner such that the 2D sensors collectively provide a 360° view of the collection vehicle's surroundings, such as a set of 6 or 7 cameras. Other arrangements are also possible.

Three-dimensional sensor 906 may include one or more 3D sensors that are configured to capture 3D data (e.g., LIDAR data) representative of the collection vehicle's surroundings. Examples of 3D sensors may include LIDAR devices, 3D radar devices, 3D sonar devices, 3D ultrasound devices, and camera arrays equipped for stereo vision and/or visual SLAM, among other possibilities. In example implementations, 3D sensor 906 may include one or more 3D sensors arranged in a manner such that the one or more 3D sensors collectively provide a 360° view of the collection vehicle's surroundings. Other arrangements are also possible.

Location sensor 907 may include one or more sensors that are configured to detect a position, orientation, and/or heading of collection vehicle 301. More specifically, these one or more sensors may facilitate determining the collection vehicle's geolocation, velocity, acceleration, and/or other motions states. Examples of location sensors may include IMUs, global navigation satellite system (GNSS) receivers, accelerometers, gyroscopes, and magnetometers, among other possibilities.

Collection vehicle 301 further includes an object-detection system 908 that is generally configured to help collection vehicle 301 to perceive its surroundings, place itself within a given map, and autonomously navigate and drive. To these ends, object-detection system 908 may analyze data from various 2D sensors 905, 3D sensors 906, and/or location sensors 907 and facilitate collection vehicle 301 making determinations based on that analysis. For instance, object-detection system 908 may include one or more trained object-detection models, each of which may be configured to take as input 2D and/or 3D sensor data captured by collection vehicle 301 and output a likelihood that the sensor data captured one or more instances of an object that the given object-detection model was trained to detect. Object-detection system 908 may include other components and functionality as well.

Collection vehicle 301 also includes a navigation system 909 that may utilize information from object-detection system 908 and/or from one or more of the collection vehicle's sensors to facilitate autonomously navigating collection vehicle 301. To this end, navigation system 909 may also utilize various other information that may be stored locally on collection vehicle 301 and/or provided in real-time to collection vehicle 301 by other entities, such as map, traffic, weather, and navigation information.

Propulsion system 901, object-detection system 908, and navigation system 909 may collectively function to facilitate collection vehicle 301 autonomously driving through and performing other operations in real-world environments.

A person of ordinary skill in the art will appreciate that FIG. 9 is but one example arrangement of components of a collection vehicle and that numerous other arrangements are also possible and contemplated herein. For example, collection vehicles may include additional components not illustrated in FIG. 9 and/or more or fewer of the illustrated components.

FIG. 10 depicts a simplified block diagram of certain structural details of auto-labeling system 302 of FIG. 3. In practice, auto-labeling system 302 may include one or more computing systems (e.g., one or more servers, one or more mainframe computers, one or more desktop computers, etc.) that collectively include at least one processor 1001, data storage 1002, and at least one communication interface 1003. Moreover, auto-labeling system 302 may optionally include at least one input interface 1004 and/or at least one output interface 1005. In any case, each of these components may be communicatively connected by link 1006 that may take the form of a system bus, communication network, or some other connection mechanism.

Processor 1001 may comprise one or more processor components that may include one or more of (i) a general-purpose processor (e.g., a microprocessor), (ii) a special-purpose processor (e.g., an application-specific integrated circuit, a digital signal processor, a graphics processing unit, a vision processing unit, etc.), (iii) a programmable logic device (e.g., a field-programmable gate array), or (iv) a controller (e.g., a microcontroller), among other possibilities. In practice, these one or more processor components may be part of a single computing device or distributed across multiple physical computing devices that are connected via a network or the like.

Data storage 1002 may comprise one or more non-transitory computer-readable mediums that may include one or more of (i) a volatile medium (e.g., random-access memory, a register, a cache, a buffer, etc.) or a non-volatile medium (e.g., read-only memory, a hard-disk drive, a solid-state drive, flash memory, an optical disk, etc.). In practice, these one or more storage mediums may be part of a single computing device or distributed across multiple physical computing devices that are connected via a network or the like.

As shown in FIG. 10, data storage 1002 may be provisioned with software that provides auto-labeling system 302 with the capability to perform various functions disclosed herein (e.g., the functions discussed above with reference to FIGS. 4A-4B). In this respect, the software may take the form of program instructions that are executable by processor 1001 such that auto-labeling system 302 is configured to perform the various functions disclosed herein. As also shown in FIG. 10, data storage 1002 may further store a variety of data in one or more databases, file systems, or other information depositories. Such data may include sensor data captured by collection vehicles, 3D point clouds, 2D tracks, 3D tracks, object data structures, geometric maps, semantic maps, data indicative of object trajectories, files for generated time-aggregated, 3D visualizations of real-world environments, training data for object-detection models, trained object-detection models, etc.

Communication interface 1003 may include one or more communication interfaces that are configured to facilitate communication with other entities, such as collection vehicles and curator client stations. These one or more communication interfaces may include one or more of (i) a wired communication interface (e.g., an Ethernet interface, a serial bus interface such as Firewire or USB, etc.) or (ii) a wireless communication interface (e.g., a chipset-antenna pair configured for wireless communication, a wireless NIC, a WiFi adapter, a cellular network adapter, etc.). In practice, communication interface 1003 may include multiple interfaces of different types (e.g., a wired interface configured to obtain information from collection vehicles and a wireless interface configured to communicate with curator client stations via one or more LANs and/or WANs of network 304).

Input interface 1004 may include one or more input interfaces configured to allow user interaction with auto-labeling system 302 (e.g., for local annotations or other local curation tasks). In this regard, these one or more input interfaces may include one or more of a keyboard, a mouse, a trackpad, a touch-sensitive surface, a stylus, a microphone, a camera, a video camera, or a scanner, among other possibilities.

Output interface 1005 may include one or more output interfaces configured to provide output to a user of auto-labeling system 302 (e.g., local display of time-aggregated, 3D visualizations). These one or more output interfaces may include one or more of a display screen, a speaker system, or a printer, among other possibilities.

A person of ordinary skill in the art will appreciate that FIG. 10 is but one example arrangement of components of an auto-labeling system and that numerous other arrangements are also possible and contemplated herein. For example, auto-labeling systems may include additional components not illustrated in FIG. 10 and/or more or fewer of the illustrated components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and sprit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

The invention claimed is:

1. A computer-implemented method comprising:
obtaining sensor data captured by a vehicle while operating in a real-world environment during a window of time, wherein the captured sensor data comprises three-dimensional (3D) sensor data captured by the vehicle across the window of time and associated two-dimensional (2D) image data captured by the vehicle across the window of time;
based on an analysis of the 2D image data captured by the vehicle across the window of time, generating a respective 2D track for each of one or more objects detected in the real-world environment across the window of time, wherein each respective 2D track comprises a set of one or more 2D labels that identify a 2D position of a respective object at one or more points along the respective 2D track;
for each of the one or more objects detected in the real-world environment:
using the respective 2D track for an object to identify, within the 3D sensor data captured by the vehicle across the window of time, a respective set of 3D data points associated with the object across the window of time; and
based on the respective set of 3D data points associated with the object across the window of time, generating a respective 3D track for the object, wherein the respective 3D track comprises a set of one or more 3D labels that identify a 3D position of the object at one or more points along the respective 3D track; and
based on the 3D sensor data, generating a time-aggregated, 3D visualization of the real-world environment in which the vehicle was operating during the window of time, wherein the time-aggregated, 3D visualization includes, for each of the one or more objects, at least one respective 3D label that is generated based on the respective 3D track for the object and identifies a 3D position of the respective object within the time-aggregated, 3D visualization at one or more times during the window of time.

2. The computer-implemented method of claim 1, wherein each 2D label included in the respective 2D track for each of the one or more objects comprises one or both of a 2D bounding box or a 2D object mask.

3. The computer-implemented method of claim 1, wherein each 3D label included in the respective 3D track for each of the one or more objects comprises one or both of a 3D bounding box or a 3D convex hull.

4. The computer-implemented method of claim 1, further comprising:
   receiving, from a client station, a request to change the at least one respective 3D label for a given object of the one or more objects; and
   updating the respective 3D track for the given object in accordance with the requested change to the least one respective 3D label for the given object.

5. The computer-implemented method of claim 4, wherein updating the respective 3D track for the given object in accordance with the requested change to the least one respective 3D label for the given object comprises:
   propagating the requested change to the least one respective 3D label for the given object to each of one or more other 3D labels included in the respective 3D track for the given object using a motion model.

6. The computer-implemented method of claim 1, further comprising:
   generating a time-aggregated 3D point cloud based at least on (i) the 3D sensor data captured by the vehicle across the window of time and (ii) localization data associated with the vehicle, wherein the time-aggregated 3D point cloud comprises an aggregation of multiple captures of 3D sensor data from multiple different capture times that have been translated into a common frame of reference.

7. The computer-implemented method of claim 6, wherein generating the time-aggregated, 3D point cloud comprises:
   generating a preliminary time-aggregated, 3D point cloud based at least on (i) the 3D sensor data captured by the vehicle across the window of time and (ii) the localization data; and
   applying one or more filters to the preliminary time-aggregated, 3D point cloud and thereby generating the time-aggregated, 3D point cloud.

8. The computer-implemented method of claim 7, wherein applying the one or more filters to the preliminary time-aggregated, 3D point cloud comprises:
   identifying a semantic map associated with the real-world environment in which the vehicle was operating during the window of time;
   identifying data indicating a trajectory of the vehicle;
   creating a cropped version of the semantic map that excludes map features outside of a predetermined distance from the trajectory of the vehicle;
   based on the cropped version of the semantic map, identifying one or more irrelevant objects within the real-world environment; and
   applying a filter to the preliminary time-aggregated, 3D point cloud to remove 3D data points from the preliminary time-aggregated, 3D point cloud that are associated with the one or more irrelevant objects.

9. The computer-implemented method of claim 7, wherein applying the one or more filters to the preliminary time-aggregated, 3D point cloud comprises:
applying a filter to the preliminary time-aggregated, 3D point cloud to remove 3D data points from the preliminary time-aggregated, 3D point cloud that are identified as being associated with a ground feature within the real-world environment.

10. The computer-implemented method of claim 7, wherein applying the one or more filters to the preliminary time-aggregated, 3D point cloud comprises:
   applying a filter to the preliminary time-aggregated, 3D point cloud to remove 3D data points from the preliminary time-aggregated, 3D point cloud that are identified as outliers relative to other 3D data points in the preliminary time-aggregated, 3D point cloud.

11. The computer-implemented method of claim 1, further comprising, for each of the one or more objects detected in the real-world environment:
   based on the respective 3D track for an object, determining whether the object was moving at any point during the window of time, and wherein the time-aggregated, 3D visualization further includes a respective indication of whether each of the one or more objects was moving at any point during the window of time.

12. The computer-implemented method of claim 1, further comprising, for each of the one or more objects detected in the real-world environment:
   generating a respective data structure for an object that comprises one or more of (i) an identifier of the object, (ii) a classification assigned to the object, (iii) the 3D track for the object, (iv) an indication of whether the object was in motion at any point during the window of time, (v) an indication of which capture of the 3D sensor data provides a best view of the object, or (vi) a convex hull that demarcates the respective set of 3D data points associated with the object across the window of time.

13. A non-transitory computer-readable medium comprising program instructions stored thereon that are executable by at least one processor to cause a computing system to perform functions comprising:
   obtaining sensor data captured by a vehicle while operating in a real-world environment during a window of time, wherein the captured sensor data comprises three-dimensional (3D) sensor data captured by the vehicle across the window of time and associated two-dimensional (2D) image data captured by the vehicle across the window of time;
   based on an analysis of the 2D image data captured by the vehicle across the window of time, generating a respective 2D track for each of one or more objects detected in the real-world environment across the window of time, wherein each respective 2D track comprises a set of one or more 2D labels that identify a 2D position of a respective object at one or more points along the respective 2D track;
   for each of the one or more objects detected in the real-world environment:
      using the respective 2D track for an object to identify, within the 3D sensor data captured by the vehicle across the window of time, a respective set of 3D data points associated with the object across the window of time; and
      based on the respective set of 3D data points associated with the object across the window of time, generating a respective 3D track for the object, wherein the respective 3D track comprises a set of one or more 3D labels identify a 3D position of the object at one or more points along the respective 3D track; and based on the 3D sensor data, generating a time-aggregated, 3D visualization of the real-world environment in which the vehicle was operating during the window of time, wherein the time-aggregated, 3D visualization includes, for each of the one or more objects, at least one respective 3D label that is generated based on the respective 3D track for the object and identifies a 3D position of the respective object within the time-aggregated, 3D visualization at one or more times during the window of time.

14. The computer-readable medium of claim 13, further comprising program instructions stored thereon that are executable by the at least one processor to cause the computing system to perform functions comprising:
receiving, from a client station, a request to change the at least one respective 3D label for a given object of the one or more objects; and
updating the respective 3D track for the given object in accordance with the requested change to the least one respective 3D label for the given object.

15. The computer-readable medium of claim 13, further comprising program instructions stored thereon that are executable to cause the computing system to perform functions comprising:
generating a time-aggregated 3D point cloud based at least on (i) the 3D sensor data captured by the vehicle across the window of time and (ii) localization data associated with the vehicle, wherein the time-aggregated 3D point cloud comprises an aggregation of multiple captures of 3D sensor data from multiple different capture times that have been translated into a common frame of reference.

16. The computer-readable medium of claim 15, wherein generating the time-aggregated, 3D point cloud comprises:
generating a preliminary time-aggregated, 3D point cloud based at least on (i) the 3D sensor data captured by the vehicle across the window of time and (ii) the localization data; and
applying one or more filters to the preliminary time-aggregated, 3D point cloud and thereby generating the time-aggregated, 3D point cloud.

17. The computer-readable medium of claim 16, wherein applying the one or more filters to the preliminary time-aggregated, 3D point cloud comprises:
identifying a semantic map associated with the real-world environment in which the vehicle was operating during the window of time;
identifying data indicating a trajectory of the vehicle;
creating a cropped version of the semantic map that excludes map features outside of a predetermined distance from the trajectory of the vehicle;
based on the cropped version of the semantic map, identifying one or more irrelevant objects within the real-world environment; and
applying a filter to the preliminary time-aggregated, 3D point cloud to remove 3D data points from the preliminary time-aggregated, 3D point cloud that are associated with the one or more irrelevant objects.

18. The computer-readable medium of claim 16, wherein applying the one or more filters to the preliminary time-aggregated, 3D point cloud comprises:
applying a filter to the preliminary time-aggregated, 3D point cloud to remove 3D data points from the preliminary time-aggregated, 3D point cloud that are identified as being associated with a ground feature within the real-world environment.

19. The computer-readable medium of claim 16, wherein applying the one or more filters to the preliminary time-aggregated, 3D point cloud comprises:
applying a filter to the preliminary time-aggregated, 3D point cloud to remove 3D data points from the preliminary time-aggregated, 3D point cloud that are identified as outliers relative to other 3D data points in the preliminary time-aggregated, 3D point cloud.

20. A computing system comprising:
at least one processor;
a non-transitory computer-readable medium; and
program instructions stored on the non-transitory computer-readable medium that are executable by the at least one processor such that the computing system is configured to:
obtain sensor data captured by a vehicle while operating in a real-world environment during a window of time, wherein the captured sensor data comprises three-dimensional (3D) sensor data captured by the vehicle across the window of time and associated two-dimensional (2D) image data captured by the vehicle across the window of time;
based on an analysis of the 2D image data captured by the vehicle across the window of time, generate a respective 2D track for each of one or more objects detected in the real-world environment across the window of time, wherein each respective 2D track comprises a set of one or more 2D labels that identify a 2D position of a respective object along the respective 2D track;
for each of the one or more objects detected in the real-world environment:
use the respective 2D track for an object to identify, within the 3D sensor data captured by the vehicle across the window of time, a respective set of 3D data points associated with the object across the window of time; and
based on the respective set of 3D data points associated with the object across the window of time, generate a respective 3D track for the object, wherein the respective 3D track comprises a set of one or more 3D labels that identify a 3D position of the object along the respective 3D track; and
based on the 3D sensor data, generate a time-aggregated, 3D visualization of the real-world environment in which the vehicle was operating during the window of time, wherein the time-aggregated, 3D visualization includes, for each of the one or more objects, at least one respective 3D label that is generated based on the respective 3D track for the object and identifies a 3D position of the respective object within the time-aggregated, 3D visualization at one or more times during the window of time.

21. The computer-implemented method of claim 1, further comprising:
causing the time-aggregated, 3D visualization to be presented via a client station to a curator that is tasked with labelling objects within the captured sensor data.

22. The computer-implemented method of claim 1, wherein the time-aggregated, 3D visualization of the real-world environment in which the vehicle was operating during the window of time comprises multiple captures of 3D sensor data from multiple different capture times that have been aggregated together and translated into a common frame of reference.

* * * * *